US012567371B2

(12) United States Patent
Wang et al.

(10) Patent No.: US 12,567,371 B2
(45) Date of Patent: Mar. 3, 2026

(54) DISPLAY DRIVING DEVICE

(71) Applicant: AUO Corporation, Hsinchu City (TW)

(72) Inventors: Cheng-Kuang Wang, Hsinchu City (TW); Syuan-Ying Lin, Hsinchu City (TW); Min-Hsuan Chiu, Hsinchu City (TW); Wei-Ming Cheng, Hsinchu City (TW); Chen-Yu Chang, Hsinchu City (TW); Shu-Hao Huang, Hsinchu City (TW); Ya-Jung Wang, Hsinchu City (TW); Ting-Wei Guo, Hsinchu City (TW); Sung-Yu Su, Hsinchu City (TW)

(73) Assignee: AUO CORPORATION, Hsinchu City (TW)

( * ) Notice: Subject to any disclaimer, the term of this patent is extended or adjusted under 35 U.S.C. 154(b) by 0 days.

(21) Appl. No.: 18/932,273

(22) Filed: Oct. 30, 2024

(65) Prior Publication Data

US 2025/0218369 A1 Jul. 3, 2025

(30) Foreign Application Priority Data

Dec. 27, 2023 (TW) ................................ 112151134

(51) Int. Cl.
*G09G 3/3233* (2016.01)

(52) U.S. Cl.
CPC ... *G09G 3/3233* (2013.01); *G09G 2300/0804* (2013.01); *G09G 2300/0842* (2013.01); *G09G 2310/08* (2013.01); *G09G 2320/0233* (2013.01); *G09G 2320/0242* (2013.01); *G09G 2320/0247* (2013.01); *G09G 2320/0257* (2013.01); *G09G 2320/0666* (2013.01); *G09G 2320/0686* (2013.01); *G09G 2354/00* (2013.01)

(58) Field of Classification Search
CPC ... G09G 3/3233; G09G 3/2003; G09G 3/2022
See application file for complete search history.

(56) References Cited

U.S. PATENT DOCUMENTS

| | | | | |
|---|---|---|---|---|
| 11,935,453 B2 * | 3/2024 | Park | G09G 3/2003 |
| 2016/0078826 A1 * | 3/2016 | Yoo | G09G 3/3648 345/88 |
| 2016/0180791 A1 | 6/2016 | Lee | |
| 2016/0210892 A1 * | 7/2016 | Ohara | G09G 3/2022 |
| 2018/0108317 A1 * | 4/2018 | Ji | G09G 3/3685 |
| 2018/0151137 A1 | 5/2018 | Lee | |

(Continued)

FOREIGN PATENT DOCUMENTS

| | | |
|---|---|---|
| CN | 105719606 A | 6/2016 |
| TW | I857808 B | 10/2024 |

*Primary Examiner* — Sardis F Azongha
(74) *Attorney, Agent, or Firm* — WPAT, PC

(57) ABSTRACT

A display driving device comprises a signal supplier and a panel. The signal supplier is configured to output a first data signal, a second data signal, and a third data signal. The panel is coupled to the signal supplier. The panel includes a first region to a ninth region. During a first period, the first region, the second region, and the third region output a red signal based on the first data signal, the fourth region, the fifth region, and the sixth region output a green signal based on the second data signal, and the seventh region, the eighth region and the ninth region output a blue signal based on the third data signal. The red signal, the green signal, and the blue signal are different from each other.

20 Claims, 16 Drawing Sheets

(56) References Cited

U.S. PATENT DOCUMENTS

| | | | | |
|---|---|---|---|---|
| 2018/0151145 | A1* | 5/2018 | Lee | G09G 5/02 |
| 2018/0308410 | A1* | 10/2018 | Chen | G09G 3/2003 |
| 2019/0180667 | A1 | 6/2019 | Lin | |
| 2020/0074908 | A1* | 3/2020 | Kang | G09G 3/20 |
| 2023/0018362 | A1* | 1/2023 | Park | G09G 3/3241 |
| 2023/0154371 | A1 | 5/2023 | Dietz | |

* cited by examiner

400

500D

DISPLAY DRIVING DEVICE

RELATED APPLICATIONS

This application claims the priority benefit of Taiwan Application Serial Number 112151134, filed Dec. 27, 2023, which is herein incorporated by reference.

BACKGROUND

Field of Invention

The present disclosure relates to a driving device. More particularly, the present disclosure relates to a display driving device.

Description of Related Art

Currently, when a panel displays an image, it sequentially shows a full red screen, a full green screen, and a full blue screen. These screens rapidly switch on the panel to form a complete image.

However, when a user views the panel, the rapid flickering of brightness and color on the panel can easily cause the user to feel dizzy.

SUMMARY

The summary aims to provide a simplified overview of the present disclosure to give the reader a basic understanding. This summary is not a comprehensive overview of the present disclosure and is not intended to highlight essential or critical elements of the embodiments or to delineate the scope of the present disclosure.

One aspect of the present disclosure relates to a display driving device. The display driving device includes a signal supplier and a panel. The signal supplier is configured to output a first data signal, a second data signal, and a third data signal. The panel is coupled to the signal supplier and includes a first region, a second region, a third region, a fourth region, a fifth region, a sixth region, a seventh region, an eighth region, and a ninth region. The second region is located on one side of the first region. The third region is located on one side of the second region. The fourth region is located on other side of the first region. The fifth region is located on one side of the fourth region. The sixth region is located on one side of the fifth region. The seventh region is located on other side of the fourth region. The eighth region is located on one side of the seventh region. The ninth region is located on one side of the eighth region. During a first period, the first region, the second region, and the third region output a red signal according to the first data signal, the fourth region, the fifth region, and the sixth region output a green signal according to the second data signal, and the seventh region, the eighth region, and the ninth region output a blue signal according to the third data signal. The red signal, green signal, and blue signal are different from each other.

Another aspect of the present disclosure relates to a display driving device. The display driving device includes a signal supplier and a panel. The signal supplier is configured to output a first data signal, a second data signal, and a third data signal. The panel is coupled to the signal supplier and includes a first region, a second region, a third region, a fourth region, a fifth region, a sixth region, a seventh region, an eighth region, and a ninth region. The second region is located on one side of the first region. The third region is located on one side of the second region. The fourth region is located on other side of the first region. The fifth region is located on one side of the fourth region. The sixth region is located on one side of the fifth region. The seventh region is located on other side of the fourth region. The eighth region is located on one side of the seventh region. The ninth region is located on one side of the eighth region. During a first period, the first region, the second region, and the third region output a red signal according to the third data signal, the fourth region, the fifth region, and the sixth region output a green signal according to the second data signal, and the seventh region, the eighth region, and the ninth region output a blue signal according to the first data signal. The red signal, green signal, and blue signal are different from each other.

Yet another aspect of the present disclosure relates to a display driving device. The display driving device includes a signal supplier and a panel. The signal supplier is configured to output a first data signal, a second data signal, and a third data signal. The panel is coupled to the signal supplier and includes a first region, a second region, a third region, a fourth region, a fifth region, a sixth region, a seventh region, an eighth region, and a ninth region. The second region is located on one side of the first region. The third region is located on one side of the second region. The fourth region is located on other side of the first region. The fifth region is located on one side of the fourth region. The sixth region is located on one side of the fifth region. The seventh region is located on other side of the fourth region. The eighth region is located on one side of the seventh region. The ninth region is located on one side of the eighth region. During a first period, the first region, the sixth region, and the eighth region output a red signal according to the first data signal, the second region, the fourth region, and the ninth region output a green signal according to the second data signal, and the third region, the fifth region, and the seventh region output a blue signal according to the third data signal. The red signal, green signal, and blue signal are different from each other.

Therefore, according to the content of the present disclosure, the display driving device illustrated in the embodiments of the present disclosure can achieve a comfortable viewing experience for the user by interleaving the display of images through a plurality of display regions (or main pixels).

Upon reviewing the following embodiments, those skilled in the art to which the present disclosure pertains will easily understand the basic spirit and other inventive objectives of the present disclosure, as well as the technical means and implementation aspects employed by the present disclosure.

BRIEF DESCRIPTION OF THE DRAWINGS

The invention can be more fully understood by reading the following detailed description of the embodiment, with reference made to the accompanying drawings as follows.

Figure 1:
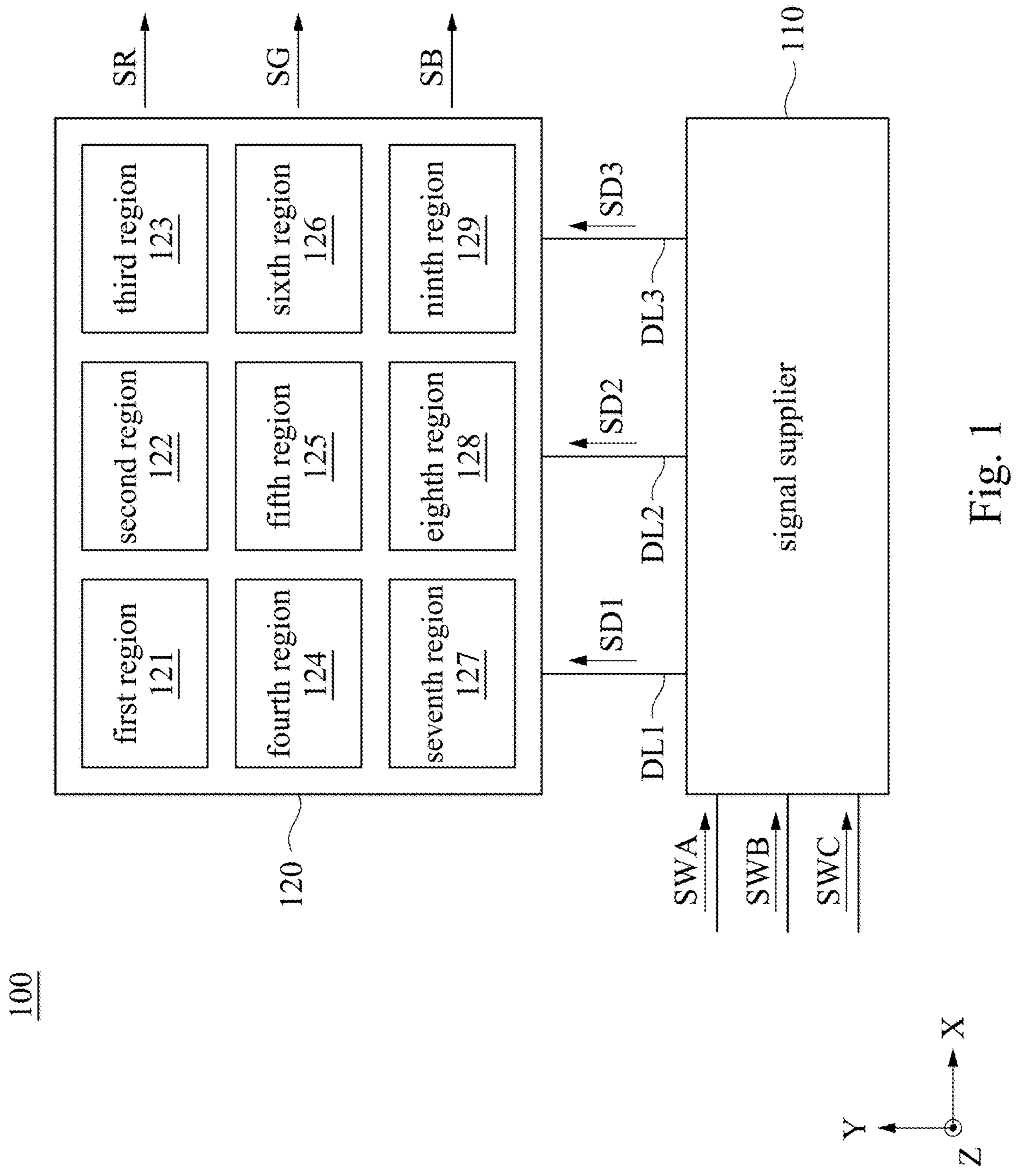
FIG. 1 is a block schematic diagram illustrating a display driving device according to an embodiment of the present disclosure.

In accordance with conventional practice, various features and elements in the figures are not drawn to scale, and the drawings are made to best present the specific features and elements related to the present disclosure. Additionally, similar or identical element symbols are used to refer to similar elements/components across different figures.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

To make the description of the present disclosure more detailed and complete, the following provides illustrative descriptions of the embodiments and specific examples of the present disclosure. However, these are not the only forms of implementing or applying the specific examples of the present disclosure. The embodiments include features of multiple specific examples, as well as the method steps and their sequences used to construct and operate these specific examples. However, other specific examples may also be utilized to achieve the same or equivalent functions and step sequences.

Unless otherwise defined in this specification, the meanings of scientific and technical terms used herein are the same as those understood and commonly used by those skilled in the art to which the present disclosure pertains. Additionally, where context does not conflict, singular nouns used in this specification encompass their plural forms, and plural nouns also encompass their singular forms.

Furthermore, the terms "coupled" or "connected" as used herein can refer to two or more elements being in direct physical or electrical contact with each other, or in indirect physical or electrical contact with each other. It can also refer to two or more elements operating or functioning together.

In this document, the term "circuit" broadly refers to an object that processes signals, which is connected in a certain manner by one or more transistors and/or one or more active or passive devices.

Certain terms are used in the specification and claims to refer to particular elements. However, it should be understood by those skilled in the art that the same elements might be referred to by different terms. The specification and claims do not distinguish elements based on the differences in names but rather based on the differences in function. The term "comprising" as used in the specification and claims is an open-ended term, and should be interpreted as "including but not limited to."

FIG. 1 illustrates a block schematic diagram of a display driving device according to an embodiment of the present disclosure. As shown in FIG. 1, in one embodiment, the display driving device 100 includes a signal supplier 110 and a panel 120. Regarding the coupling relationship, the panel 120 is coupled to the signal supplier 110.

For example, the signal supplier 110 may be a demultiplexer (De-MUX), and the panel 120 may be a panel with any type of light-emitting diode (LED), such as a Micro LED, Mini LED, or Organic LED (OLED), but the present disclosure is not limited thereto.

In this embodiment, the panel 120 includes a first region 121, a second region 122, a third region 123, a fourth region 124, a fifth region 125, a sixth region 126, a seventh region 127, an eighth region 128, and a ninth region 129. In some embodiments, the panel 120 includes at least three regions. For example, the panel 120 may have a first region 121, a second region 122, a third region 123, a fourth region 124, a fifth region 125, a sixth region 126, a seventh region 127, an eighth region 128, and a ninth region 129, but the present disclosure is not limited thereto.

Furthermore, the panel 120 may be divided into at least three regions, for example, the panel 120 may have a first region 121, a second region 122, and a third region 123, or the panel 120 may have a first region 121, a fourth region 124, and a seventh region 127, but the present disclosure is not limited thereto.

In this embodiment, the second region 122 is located on one side of the first region 121. The third region 123 is located on one side of the second region 122. The fourth region 124 is located on other side of the first region 121. The fifth region 125 is located on one side of the fourth region 124. The sixth region 126 is located on one side of the fifth region 125. The seventh region 127 is located on other side of the fourth region 124. The eighth region 128 is located on one side of the seventh region 127. The ninth region 129 is located on one side of the eighth region 128.

For example, the second region 122 may be located on the right side of the first region 121, the third region 123 on the right side of the second region 122, the fourth region 124 on the lower side of the first region 121, the fifth region 125 on the right side of the fourth region 124, the sixth region 126 on the right side of the fifth region 125, the seventh region 127 on the lower side of the fourth region 124, the eighth region 128 on the right side of the seventh region 127, and the ninth region 129 on the right side of the eighth region 128, but the present disclosure is not limited thereto.

In this embodiment, operationally, the signal supplier 110 is configured to output a first data signal SD1, a second data signal SD2, and a third data signal SD3.

In some embodiments, the signal supplier 110 receives a first switching signal SWA, a second switching signal SWB, and/or a third switching signal SWC and outputs the first data signal SD1, the second data signal SD2, and/or the third data signal SD3 according to the first switching signal SWA, the second switching signal SWB, and/or the third switching signal SWC.

In some embodiments, the signal supplier 110 has a first data line DL1, a second data line DL2, and a third data line DL3. The first data line DL1 transmits the first data signal SD1, the second data signal SD2, and/or the third data signal SD3. The second data line DL2 transmits the first data signal SD1, the second data signal SD2, and/or the third data signal SD3. The third data line DL3 transmits the first data signal SD1, the second data signal SD2, and/or the third data signal SD3.

In some embodiments, the panel 120 receives the first data signal SD1, the second data signal SD2, and/or the third data signal SD3 to output a red signal SR, a green signal SG, and/or a blue signal SB.

For example, the first data signal SD1, the second data signal SD2, or the third data signal SD3 may each correspond to a voltage value used by a pixel circuit in the panel 120 to output the red signal SR, the green signal SG, or the blue signal SB. The red signal SR may be red light with 0-255 grayscale brightness, and the green signal SG may be green light with 0-255 grayscale brightness, but the present disclosure is not limited thereto.

In some embodiments, the first region 121, the second region 122, the third region 123, the fourth region 124, the fifth region 125, the sixth region 126, the seventh region 127, the eighth region 128, and the ninth region 129 each contain a main pixel. The main pixel includes a red subpixel, a green subpixel, and a blue subpixel.

For example, the first region 121 may be a main pixel, the second region 122 may be a main pixel, the third region 123 may be a main pixel, the fourth region 124 may be a main pixel, the fifth region 125 may be a main pixel, the sixth region 126 may be a main pixel, the seventh region 127 may be a main pixel, the eighth region 128 may be a main pixel, and/or the ninth region 129 may be a main pixel, and each main pixel has a red subpixel, a green subpixel, and a blue subpixel, but the present disclosure is not limited thereto.

Figure 2:
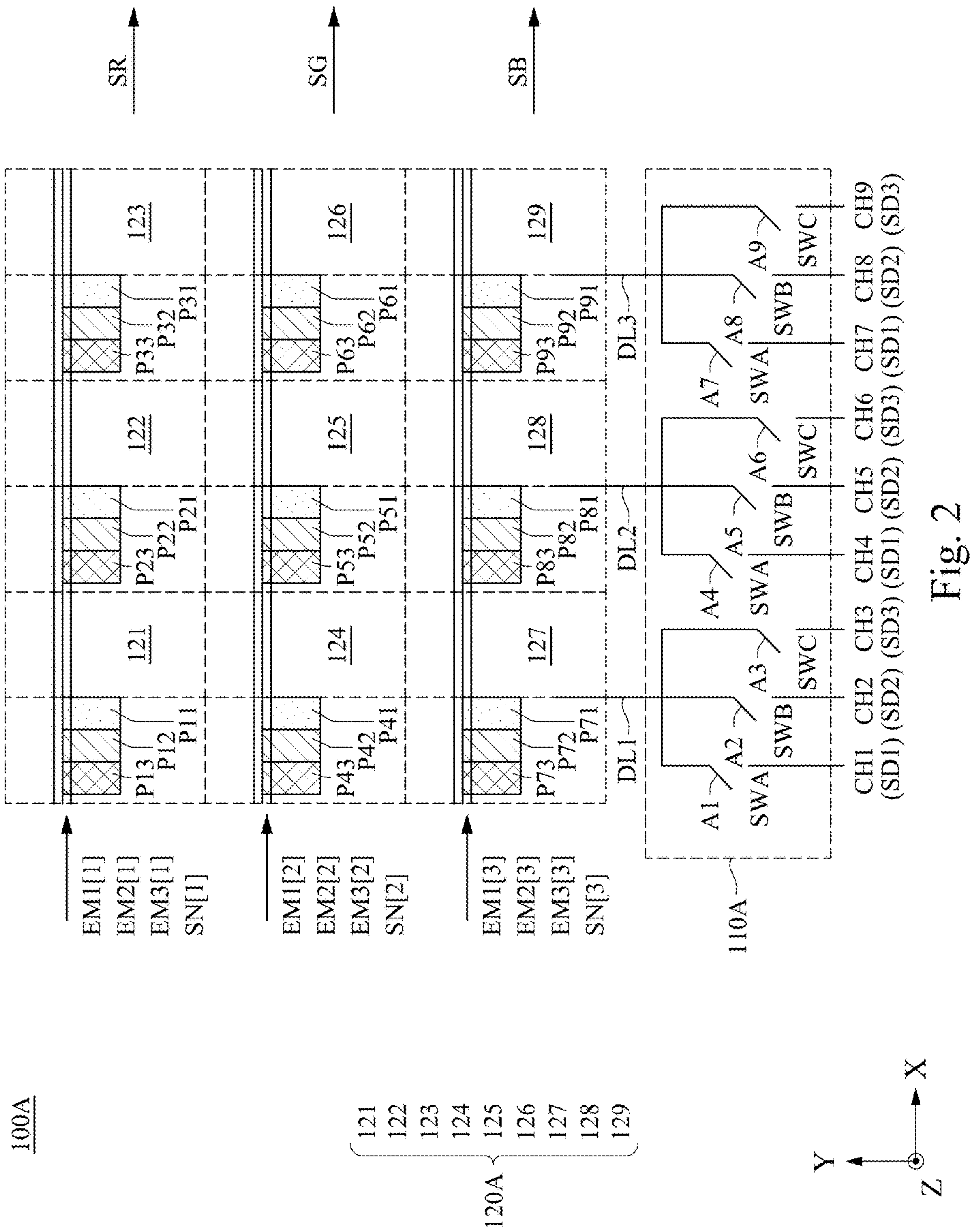
FIG. 2 is a circuit schematic diagram illustrating a display driving device according to an embodiment of the present disclosure.

FIG. 2 illustrates a circuit schematic diagram of a display driving device according to an embodiment of the present disclosure. As shown in FIG. 2, in some embodiments, the display driving device 100A includes a signal supplier 110A and a panel 120A. Regarding the coupling relationship, the panel 120A is coupled to the signal supplier 110A.

For example, the display driving device 100A, the signal supplier 110A, and the panel 120A in FIG. 2 may each correspond to the display driving device 100, the signal supplier 110, and the panel 120 in FIG. 1, but the present disclosure is not limited thereto.

In some embodiments, the signal supplier 110A includes a first wire CH1, a second wire CH2, a third wire CH3, a fourth wire CH4, a fifth wire CH5, a sixth wire CH6, a seventh wire CH7, an eighth wire CH8, a ninth wire CH9, a first data line DL1, a second data line DL2, and a third data line DL3.

For example, the first wire CH1, the fourth wire CH4, and the seventh wire CH7 may each receive and transmit the first data signal SD1, the second wire CH2, the fifth wire CH5, and the eighth wire CH8 may each receive and transmit the second data signal SD2, the third wire CH3, the sixth wire CH6, and the ninth wire CH9 may each receive and transmit the third data signal SD3, and the first data line DL1, the second data line DL2, and the third data line DL3 may each receive and transmit the first data signal SD1, the second data signal SD2, or the third data signal SD3, but the present disclosure is not limited thereto.

In some embodiments, the signal supplier 110A includes a first switch A1, a second switch A2, a third switch A3, a fourth switch A4, a fifth switch A5, a sixth switch A6, a seventh switch A7, an eighth switch A8, and a ninth switch A9.

In some embodiments, the first switch A1 receives the first switching signal SWA and outputs the first data signal SD1 according to the first switching signal SWA, the second switch A2 receives the second switching signal SWB and outputs the second data signal SD2 according to the second switching signal SWB, the third switch A3 receives the third switching signal SWC and outputs the third data signal SD3 according to the third switching signal SWC, the fourth switch A4 receives the first switching signal SWA and outputs the first data signal SD1 according to the first switching signal SWA, the fifth switch A5 receives the second switching signal SWB and outputs the second data signal SD2 according to the second switching signal SWB, the sixth switch A6 receives the third switching signal SWC and outputs the third data signal SD3 according to the third switching signal SWC, the seventh switch A7 receives the first switching signal SWA and outputs the first data signal SD1 according to the first switching signal SWA, the eighth switch A8 receives the second switching signal SWB and outputs the second data signal SD2 according to the second switching signal SWB, and the ninth switch A9 receives the third switching signal SWC and outputs the third data signal SD3 according to the third switching signal SWC.

In some embodiments, the first switch A1, the second switch A2, the third switch A3, the fourth switch A4, the fifth switch A5, the sixth switch A6, the seventh switch A7, the eighth switch A8, and the ninth switch A9 include at least one of a P-type transistor and an N-type transistor.

For example, the first switch A1, the second switch A2, the third switch A3, the fourth switch A4, the fifth switch A5, the sixth switch A6, the seventh switch A7, the eighth switch A8, and the ninth switch A9 may all be P-type thin-film transistors (TFT), but the present disclosure is not limited thereto.

In some embodiments, the panel 120A receives a plurality of first light-emitting signals EM1[1] to EM1[3], a plurality of second light-emitting signals EM2[1] to EM2[3], a plurality of third light-emitting signals EM3[1] to EM3[3], a plurality of reference signals SN[1] to SN[3], the first data signal SD1, the second data signal SD2, and/or the third data signal SD3 and outputs a red signal SR, a green signal SG, and/or a blue signal SB based on the first light-emitting signals EM1[1] to EM1[3], the second light-emitting signals EM2[1] to EM2[3], the third light-emitting signals EM3[1] to EM3[3], the reference signals SN[1] to SN[3], the first data signal SD1, the second data signal SD2, and/or the third data signal SD3.

In some embodiments, the panel 120A includes a first region 121, a second region 122, a third region 123, a fourth region 124, a fifth region 125, a sixth region 126, a seventh region 127, an eighth region 128, and a ninth region 129.

For example, the first region 121, the second region 122, the third region 123, the fourth region 124, the fifth region 125, the sixth region 126, the seventh region 127, the eighth region 128, and the ninth region 129 in FIG. 2 may each correspond to the first region 121, the second region 122, the third region 123, the fourth region 124, the fifth region 125, the sixth region 126, the seventh region 127, the eighth region 128, and the ninth region 129 in FIG. 1, but the present disclosure is not limited thereto.

In some embodiments, the first region 121 has a red pixel P11, a green pixel P12, and a blue pixel P13; the second region 122 has a red pixel P21, a green pixel P22, and a blue pixel P23; the third region 123 has a red pixel P31, a green pixel P32, and a blue pixel P33; the fourth region 124 has a red pixel P41, a green pixel P42, and a blue pixel P43; the fifth region 125 has a red pixel P51, a green pixel P52, and a blue pixel P53; the sixth region 126 has a red pixel P61, a green pixel P62, and a blue pixel P63; the seventh region 127 has a red pixel P71, a green pixel P72, and a blue pixel P73; the eighth region 128 has a red pixel P81, a green pixel P82, and a blue pixel P83; and the ninth region 129 has a red pixel P91, a green pixel P92, and a blue pixel P93.

In some embodiments, the first region 121, the second region 122, the third region 123, the fourth region 124, the fifth region 125, the sixth region 126, the seventh region 127, the eighth region 128, and the ninth region 129 each have the same pixel circuit. In some embodiments, the first region 121, the second region 122, the third region 123, the fourth region 124, the fifth region 125, the sixth region 126, the seventh region 127, the eighth region 128, and the ninth region 129 each have different pixel circuits.

Figure 4:
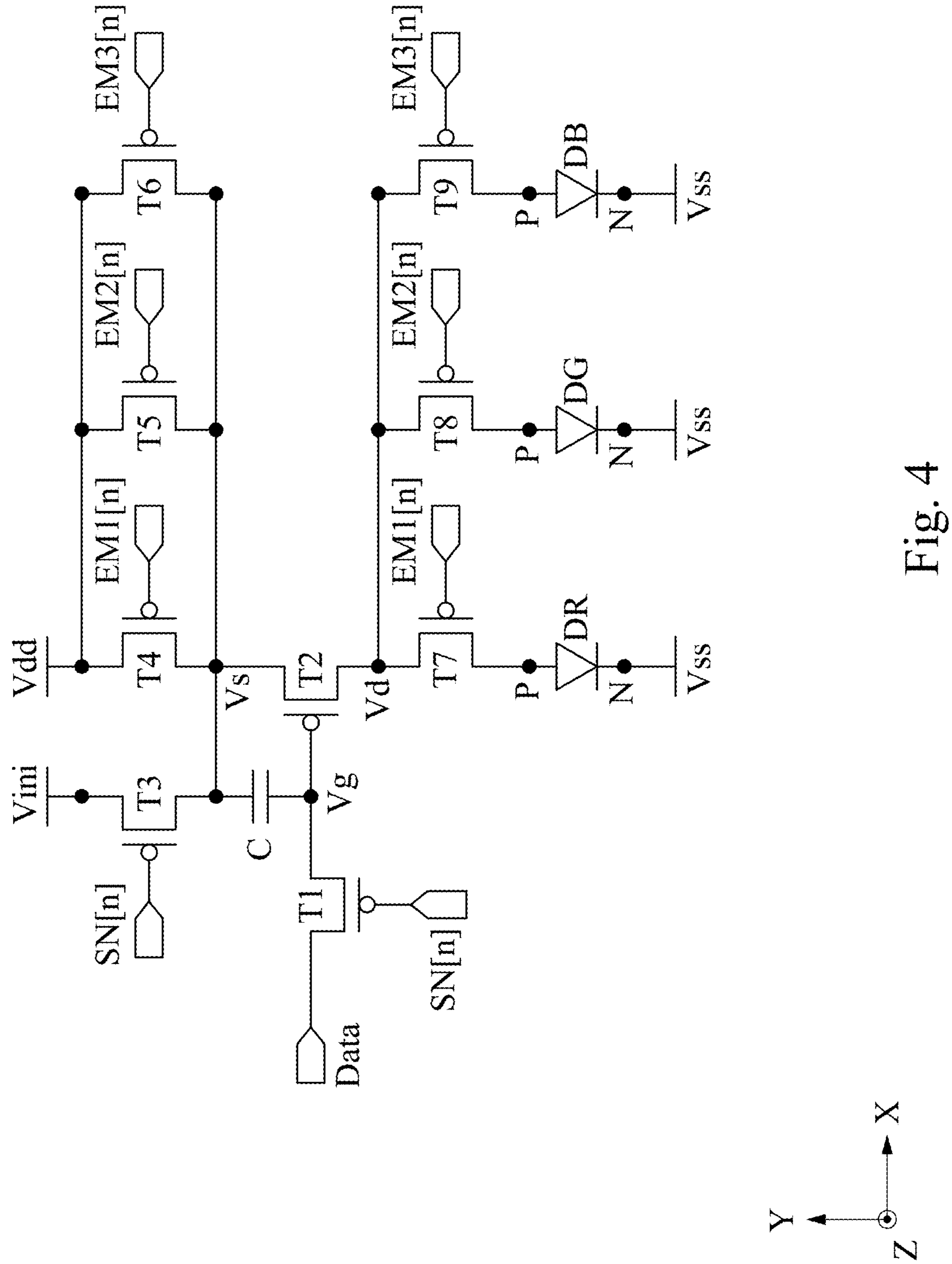
FIG. 4 is a detailed circuit diagram of a pixel circuit of a display driving device according to an embodiment of the present disclosure.

For example, the pixel circuit may correspond to the pixel circuit 400 described in FIG. 4, but the present disclosure is not limited thereto.

Figure 3:
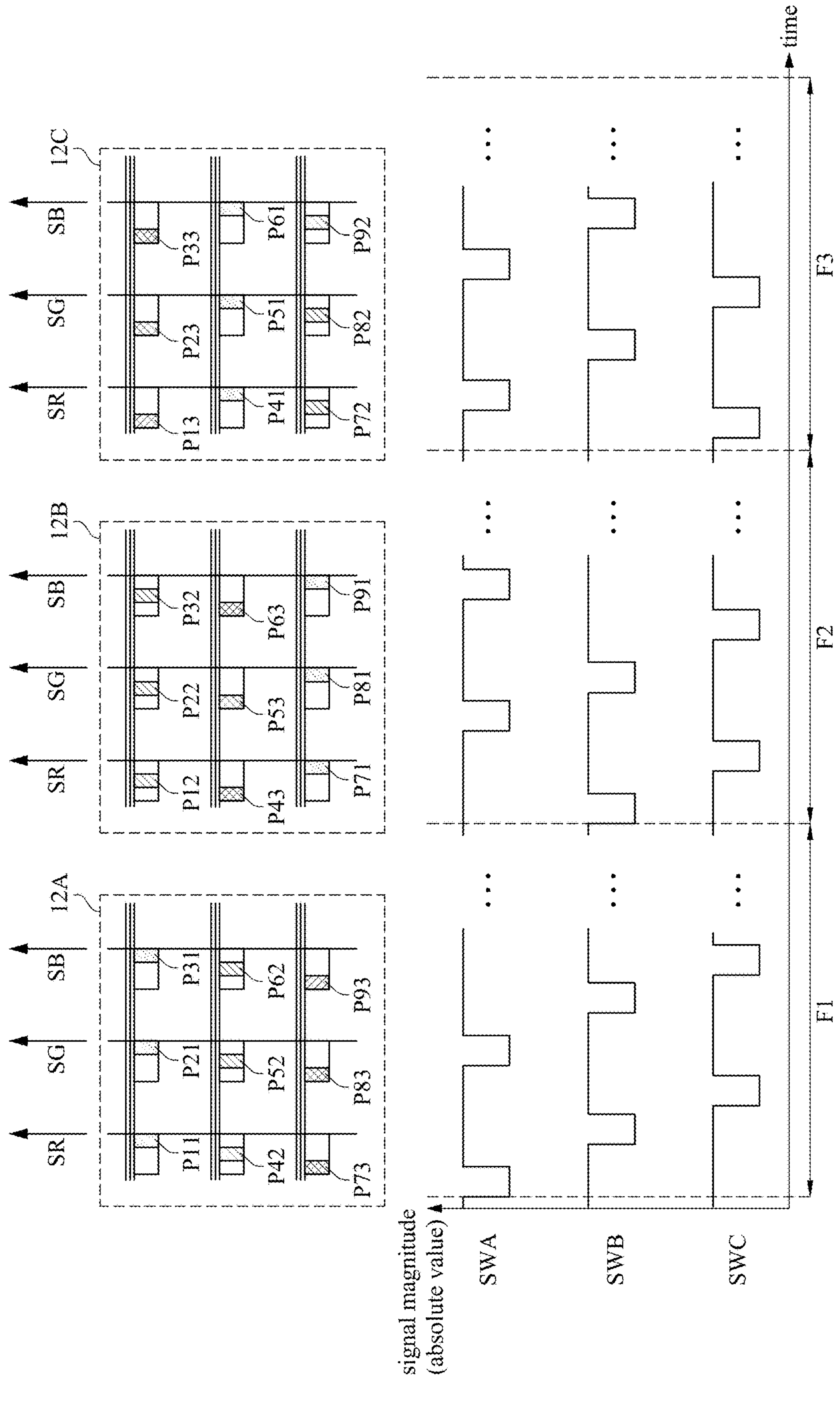
FIG. 3 is an operation scenario diagram illustrating a display driving device according to an embodiment of the present disclosure.

FIG. 3 illustrates an operation scenario diagram of a display driving device according to an embodiment of the present disclosure. As shown in FIG. 3, in some embodiments, FIG. 3 depicts the operational status of panel 12A, panel 12B, and panel 12C at different times and the timing changes of the corresponding first switching signal SWA, second switching signal SWB, and third switching signal SWC.

For example, the panel 12A, panel 12B, and panel 12C in FIG. 3 may each correspond to the panel 120A in FIG. 2. The panel 12A may represent the operational status of the panel 120A during the first period F1, the panel 12B may represent the operational status of the panel 120A during the second period F2, and the panel 12C may represent the operational status of the panel 120A during the third period F3, but the present disclosure is not limited thereto.

In some embodiments, as shown at the top of FIG. 3, during the first period F1, the red pixels P11, P21, and P31 of panel 12A output the red signal SR, the green pixels P42, P52, and P62 of panel 12A output the green signal SG, and the blue pixels P73, P83, and P93 of panel 12A output the blue signal SB.

In some embodiments, during the second period F2, the green pixels P12, P22, and P32 of panel 12B output the green signal SG, the blue pixels P43, P53, and P63 of panel 12B output the blue signal SB, and the red pixels P71, P81, and P91 of panel 12B output the red signal SR.

In some embodiments, during the third period F3, the blue pixels P13, P23, and P33 of panel 12C output the blue signal SB, the red pixels P41, P51, and P61 of panel 12C output the red signal SR, and the green pixels P72, P82, and P92 of panel 12C output the green signal SG.

FIG. 4 illustrates a detailed circuit diagram of a pixel circuit of a display driving device according to an embodiment of the present disclosure. As shown in FIG. 4, in some embodiments, the pixel circuit 400 includes a plurality of transistors T1 to T9, a capacitor C, and emitters DR, DG, and DB.

For example, the plurality of transistors T1 to T9 can be any type of transistor, such as P-type thin-film transistors. The emitter DR can be a red light-emitting diode, the emitter DG can be a green light-emitting diode, and the emitter DB can be a blue light-emitting diode, but the present disclosure is not limited thereto.

In some embodiments, regarding the connection relationship, one terminal of the transistor T1 receives a data signal Data, the control terminal of the transistor T1 receives a reference signal SN[n], and the other terminal of the transistor T1 is coupled to the capacitor C. One terminal of the transistor T2 is coupled to the transistor T3, the control terminal of the transistor T2 is coupled to the transistor T1, and the other terminal of the transistor T2 is coupled to the transistor T7. One terminal of the transistor T3 receives a signal Vini, the control terminal of the transistor T3 receives the reference signal SN[n], and the other terminal of the transistor T3 is coupled to the capacitor C. One terminal of the transistor T4 receives a signal Vdd, the control terminal of the transistor T4 receives a first light-emitting signal EM1[n], and the other terminal of the transistor T4 is coupled to the transistor T2. One terminal of the transistor T5 receives the signal Vdd, the control terminal of the transistor T5 receives a second light-emitting signal EM2[n], and the other terminal of the transistor T5 is coupled to the transistor T2. One terminal of the transistor T6 receives the signal Vdd, the control terminal of the transistor T6 receives a third light-emitting signal EM3[n], and the other terminal of the transistor T6 is coupled to the transistor T2.

In this embodiment, one terminal of the transistor T7 is coupled to the transistor T2, the control terminal of the transistor T7 receives the first light-emitting signal EM1[n], and the other terminal of the transistor T7 is coupled to the emitter DR. One terminal of the transistor T8 is coupled to the transistor T2, the control terminal of the transistor T8 receives the second light-emitting signal EM2[n], and the other terminal of the transistor T8 is coupled to the emitter DG. One terminal of the transistor T9 is coupled to the transistor T2, the control terminal of the transistor T9 receives the third light-emitting signal EM3[n], and the other terminal of the transistor T9 is coupled to the emitter DB. One terminal of the emitter DR is coupled to the transistor T7, and the other terminal receives a signal Vss. One terminal of the emitter DG is coupled to the transistor T8, and the other terminal receives the signal Vss. One terminal of the emitter DB is coupled to the transistor T9, and the other terminal receives the signal Vss.

For example, the data signal Data in FIG. 4 can correspond to the first data signal SD1, the second data signal SD2, and/or the third data signal SD3 in FIG. 2. The first light-emitting signal EM1[n] in FIG. 4 can correspond to the first light-emitting signal EM1[1], EM1[2], and/or EM1[3] in FIG. 2. The second light-emitting signal EM2[n] in FIG. 4 can correspond to the second light-emitting signal EM2[1], EM2[2], and/or EM2[3] in FIG. 2. The third light-emitting signal EM3[n] in FIG. 4 can correspond to the third light-emitting signal EM3[1], EM3[2], and/or EM3[3] in FIG. 2. The reference signal SN[n] in FIG. 4 can correspond to the reference signal SN[1], SN[2], and/or SN[3] in FIG. 2. The voltage value of the signal Vdd and/or the signal Vini can be a voltage value greater than or equal to 0 or any voltage value, and the voltage value of the signal Vss can be a voltage value less than or equal to 0 or any voltage value, but the present disclosure is not limited thereto.

Furthermore, the first region 121, the second region 122, the third region 123, the fourth region 124, the fifth region 125, the sixth region 126, the seventh region 127, the eighth region 128, and the ninth region 129 in FIG. 1 can each have the pixel circuit 400 shown in FIG. 4, but the present disclosure is not limited thereto.

It is noted that the pixel circuit 400 of the first region 121, the pixel circuit 400 of the second region 122, and the pixel circuit 400 of the third region 123 all receive the first light-emitting signal EM1[1], the second light-emitting signal EM2[1], the third light-emitting signal EM3[1], and the reference signal SN[1]. The pixel circuit 400 of the fourth region 124, the pixel circuit 400 of the fifth region 125, and the pixel circuit 400 of the sixth region 126 all receive the first light-emitting signal EM1[2], the second light-emitting signal EM2[2], the third light-emitting signal EM3[2], and the reference signal SN[2]. The pixel circuit 400 of the seventh region 127, the pixel circuit 400 of the eighth region 128, and the pixel circuit 400 of the ninth region 129 all receive the first light-emitting signal EM1[3], the second light-emitting signal EM2[3], the third light-emitting signal EM3[3], and the reference signal SN[3].

In some embodiments, the transistor T4, the transistor T5, and the transistor T6 can be connected in parallel with each other.

Figure 5:
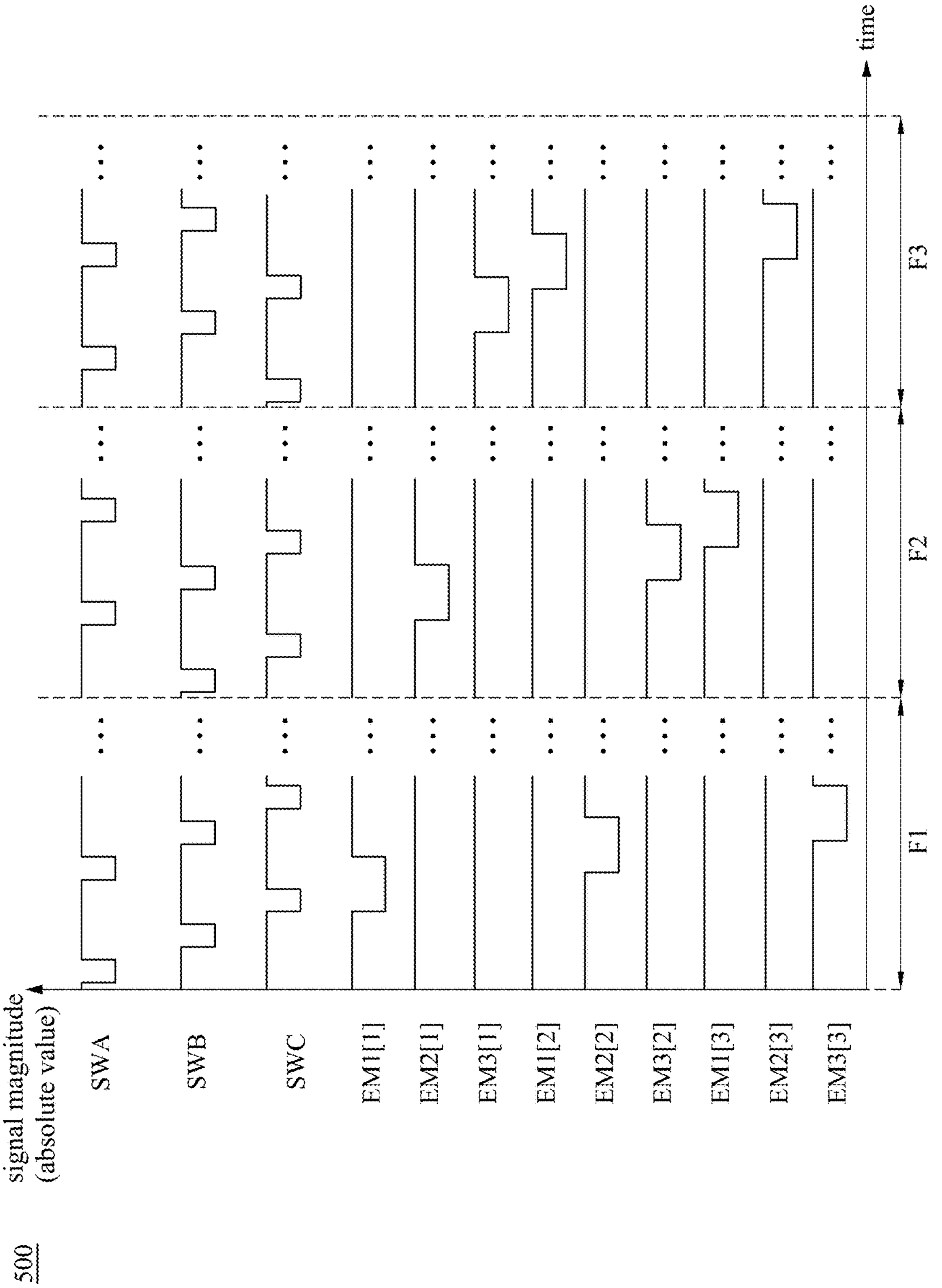
FIG. 5 is a timing diagram of a plurality of signals of a display driving device according to an embodiment of the present disclosure.

FIG. 5 illustrates a timing diagram of a plurality of signals of a display driving device according to an embodiment of the present disclosure. As shown in FIG. 5, in some embodiments, the timing diagram 500 includes a first period F1, a second period F2, a third period F3, a first switching signal SWA, a second switching signal SWB, a third switching signal SWC, a plurality of first light-emitting signals EM1[1] to EM1[3], a plurality of second light-emitting signals EM2[1] to EM2[3], and a plurality of third light-emitting signals EM3[1] to EM3[3].

For example, the first switching signal SWA, the second switching signal SWB, and the third switching signal SWC in FIG. 5 can each correspond to the first switching signal SWA, the second switching signal SWB, and the third switching signal SWC in FIG. 2. The first light-emitting signals EM1[1], EM1[2], and EM1[3] in FIG. 5 can each correspond to the first light-emitting signals EM1[1], EM1[2], and EM1[3] in FIG. 2. The second light-emitting signals EM2[1], EM2[2], and EM2[3] in FIG. 5 can each correspond to the second light-emitting signals EM2[1], EM2[2], and EM2[3] in FIG. 2. The third light-emitting signals EM3[1], EM3[2], and EM3[3] in FIG. 5 can each correspond to the third light-emitting signals EM3[1], EM3[2], and EM3[3] in FIG. 2. The first period F1, the second period F2, and the third period F3 can each be a frame time, but the present disclosure is not limited thereto.

In some embodiments, during the first period F1, the first switching signal SWA, the second switching signal SWB, the third switching signal SWC, the first light-emitting signal EM1[1], the second light-emitting signal EM2[2], and the third light-emitting signal EM3[3] each have a pulse signal, while the second light-emitting signal EM2[1], the third light-emitting signal EM3[1], the first light-emitting signal EM1[2], the third light-emitting signal EM3[2], the first light-emitting signal EM1[3], and the second light-emitting signal EM2[3] each have a steady-level signal.

In some embodiments, during the second period F2, the first switching signal SWA, the second switching signal SWB, the third switching signal SWC, the second light-emitting signal EM2[1], the third light-emitting signal EM3[2], and the first light-emitting signal EM1[3] each have a pulse signal, while the first light-emitting signal EM1[1], the third light-emitting signal EM3[1], the first light-emitting signal EM1[2], the second light-emitting signal EM2[2], the second light-emitting signal EM2[3], and the third light-emitting signal EM3[3] each have a steady-level signal.

In some embodiments, during the third period F3, the first switching signal SWA, the second switching signal SWB, the third switching signal SWC, the third light-emitting signal EM3[1], the first light-emitting signal EM1[2], and the second light-emitting signal EM2[3] each have a pulse signal, while the first light-emitting signal EM1[1], the second light-emitting signal EM2[1], the second light-emitting signal EM2[2], the third light-emitting signal EM3[2], the first light-emitting signal EM1[3], and the third light-emitting signal EM3[3] each have a steady-level signal.

Figure 6:
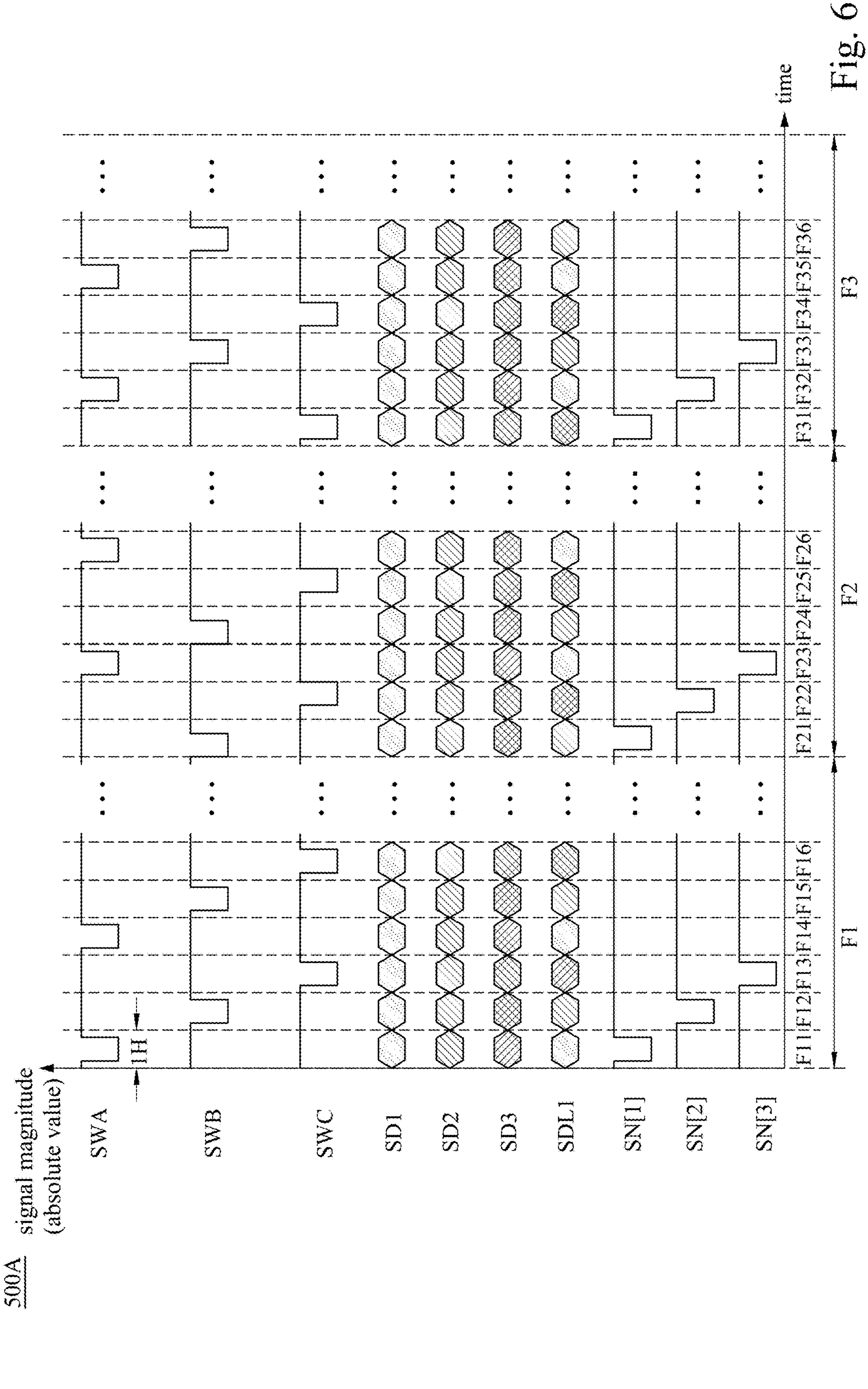
FIG. 6 is a timing diagram of a plurality of signals of a display driving device according to an embodiment of the present disclosure.

FIG. 6 illustrates a timing diagram of a plurality of signals of a display driving device according to an embodiment of the present disclosure. As shown in FIG. 6, in some embodiments, the timing diagram 500A includes a first period F1, a second period F2, a third period F3, a first switching signal SWA, a second switching signal SWB, a third switching signal SWC, a first data signal SD1, a second data signal SD2, a third data signal SD3, a signal SDL1, and a plurality of reference signals SN[1] to SN[3]. The first period F1 includes a plurality of first sub-periods F11 to F16, the second period F2 includes a plurality of second sub-periods F21 to F26, and the third period F3 includes a plurality of third sub-periods F31 to F36.

In some embodiments, the first switching signal SWA, the second switching signal SWB, and the third switching signal SWC in FIG. 6 can correspond to the first switching signal SWA, the second switching signal SWB, and the third switching signal SWC in FIG. 2. The first data signal SD1, the second data signal SD2, and the third data signal SD3 in FIG. 6 can correspond to the first data signal SD1, the second data signal SD2, and the third data signal SD3 in FIG. 2 and/or FIG. 4. The plurality of reference signals SN[1] to SN[3] in FIG. 6 can correspond to the plurality of reference signals SN[1] to SN[3] in FIG. 4.

In some embodiments, the signal SDL1 can be the result of the data line DL1 in FIG. 2 receiving the first data signal SD1, the second data signal SD2, and the third data signal SD3, but the present disclosure is not limited thereto.

Please refer to both FIG. 5 and FIG. 6. In some embodiments, a set of timing diagrams includes the timing diagram 500 in FIG. 5 and the timing diagram 500A in FIG. 6.

For example, the timing diagram 500 and the timing diagram 500A can form a set of timing diagrams, but the present disclosure is not limited thereto.

Please refer to FIGS. 1 to 6. In one embodiment, during a first period F1, a first region 121, a second region 122, and a third region 123 output a red signal SR according to a first data signal SD1. A fourth region 124, a fifth region 125, and a sixth region 126 output a green signal SG according to a second data signal SD2. A seventh region 127, an eighth region 128, and a ninth region 129 output a blue signal SB according to a third data signal SD3. The red signal SR, green signal SG, and blue signal SB are different from each other.

For example, as shown at the top of FIGS. 2 and 3, during the first period F1, a red pixel P11 of the first region 121, a red pixel P21 of the second region 122, and a red pixel P31 of the third region 123 each receive the first data signal SD1, a first emission signal EM1[1], and a reference signal SN[1] to output the red signal SR. A green pixel P42 of the fourth region 124, a green pixel P52 of the fifth region 125, and a green pixel P62 of the sixth region 126 each receive the second data signal SD2, a second emission signal EM2[2], and a reference signal SN[2] to output the green signal SG. A blue pixel P73 of the seventh region 127, a blue pixel P83 of the eighth region 128, and a blue pixel P93 of the ninth region 129 each receive the third data signal SD3, a third emission signal EM3[3], and a reference signal SN[3] to output the blue signal SB. However, the present disclosure is not limited thereto.

In one embodiment, during the first period F1, a signal supplier 110, 110A sequentially receives a first switching signal SWA, a second switching signal SWB, and a third switching signal SWC and outputs the first data signal SD1, the second data signal SD2, and the third data signal SD3 according to the first switching signal SWA, the second switching signal SWB, and the third switching signal SWC, respectively.

For example, during the first period F1, a first switch A1, a fourth switch A4, and a seventh switch A7 of the signal supplier 110A receive the first switching signal SWA to turn on and output the first data signal SD1. Then, a second switch A2, a fifth switch A5, and an eighth switch A8 of the signal supplier 110A receive the second switching signal SWB to turn on and output the second data signal SD2. Next, a third switch A3, a sixth switch A6, and a ninth switch A9 of the signal supplier 110A receive the third switching signal SWC to turn on and output the third data signal SD3. However, the present disclosure is not limited thereto.

In one embodiment, during a second period F2, the signal supplier 110, 110A sequentially receives the second switching signal SWB, the third switching signal SWC, and the first switching signal SWA and outputs the second data signal SD2, the third data signal SD3, and the first data signal SD1 according to the second switching signal SWB, the third switching signal SWC, and the first switching signal SWA, respectively.

For example, during the second period F2, the first switch A1, the fourth switch A4, and the seventh switch A7 of the signal supplier 110A receive the second switching signal SWB to turn on and output the second data signal SD2. Then, the second switch A2, the fifth switch A5, and the eighth switch A8 of the signal supplier 110A receive the third switching signal SWC to turn on and output the third data signal SD3. Next, the third switch A3, the sixth switch A6, and the ninth switch A9 of the signal supplier 110A receive the first switching signal SWA to turn on and output the first data signal SD1. However, the present disclosure is not limited thereto.

In one embodiment, during the second period F2, the first region 121, the second region 122, and the third region 123 output the green signal SG according to the second data signal SD2. The fourth region 124, the fifth region 125, and the sixth region 126 output the blue signal SB according to the third data signal SD3. The seventh region 127, the eighth region 128, and the ninth region 129 output the red signal SR according to the first data signal SD1. The second period F2 follows the first period F1.

For example, as shown at the top of FIGS. 2 and 3, during the second period F2, a green pixel P12 of the first region 121, a green pixel P22 of the second region 122, and a green pixel P32 of the third region 123 each receive the second data signal SD2, the second emission signal EM2[1], and the reference signal SN[1] to output the green signal SG. A blue pixel P43 of the fourth region 124, a blue pixel P53 of the fifth region 125, and a blue pixel P63 of the sixth region 126 each receive the third data signal SD3, the third emission signal EM3[2], and the reference signal SN[2] to output the blue signal SB. A red pixel P71 of the seventh region 127, a red pixel P81 of the eighth region 128, and a red pixel P91 of the ninth region 129 each receive the first data signal SD1, the first emission signal EM1[3], and the reference signal SN[3] to output the red signal SR. However, the present disclosure is not limited thereto.

In one embodiment, during a third period F3, the signal supplier 110, 110A sequentially receives the third switching signal SWC, the first switching signal SWA, and the second switching signal SWB and outputs the third data signal SD3, the first data signal SD1, and the second data signal SD2 according to the third switching signal SWC, the first switching signal SWA, and the second switching signal SWB, respectively.

For example, during the third period F3, the first switch A1, the fourth switch A4, and the seventh switch A7 of the signal supplier 110A receive the third switching signal SWC to turn on and output the third data signal SD3. Then, the second switch A2, the fifth switch A5, and the eighth switch A8 of the signal supplier 110A receive the first switching signal SWA to turn on and output the first data signal SD1. Next, the third switch A3, the sixth switch A6, and the ninth switch A9 of the signal supplier 110A receive the second switching signal SWB to turn on and output the second data signal SD2. However, the present disclosure is not limited thereto.

In one embodiment, during the third period F3, the first region 121, the second region 122, and the third region 123 output the blue signal SB according to the third data signal SD3. The fourth region 124, the fifth region 125, and the sixth region 126 output the red signal SR according to the first data signal SD1. The seventh region 127, the eighth region 128, and the ninth region 129 output the green signal SG according to the second data signal SD2. The third period F3 follows the second period F2.

For example, as shown at the top of FIGS. 2 and 3, during the third period F3, a blue pixel P13 of the first region 121, a blue pixel P23 of the second region 122, and a blue pixel P33 of the third region 123 each receive the third data signal SD3, the third emission signal EM3[1], and the reference signal SN[1] to output the blue signal SB. A red pixel P41 of the fourth region 124, a red pixel P51 of the fifth region 125, and a red pixel P61 of the sixth region 126 each receive the first data signal SD1, the first emission signal EM1[2], and the reference signal SN[2] to output the red signal SR. A green pixel P72 of the seventh region 127, a green pixel P82 of the eighth region 128, and a green pixel P92 of the ninth region 129 each receive the second data signal SD2, the second emission signal EM2[3], and the reference signal SN[3] to output the green signal SG. However, the present disclosure is not limited thereto.

Figure 7:
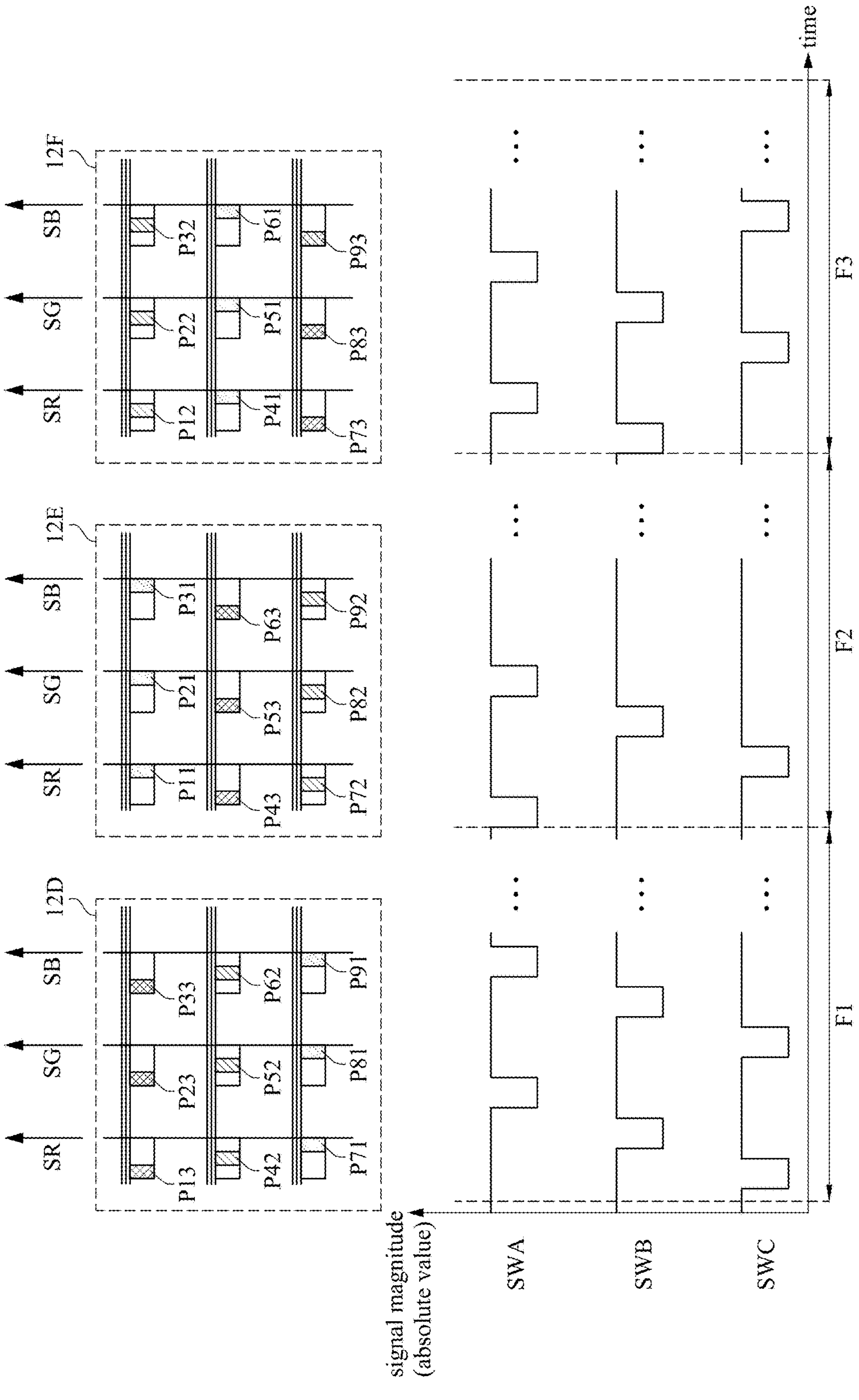
FIG. 7 is an operation scenario diagram illustrating a display driving device according to an embodiment of the present disclosure.

FIG. 7 illustrates an operation scenario of a display driving device according to an embodiment of the present disclosure. As shown in FIG. 7, in some embodiments, FIG. 7 depicts the operational status of a panel 12D, a panel 12E, and a panel 12F at different times and the timing variations of the corresponding first switching signal SWA, second switching signal SWB, and third switching signal SWC.

For example, the panel 12D, the panel 12E, and the panel 12F of FIG. 7 may each correspond to a panel 120A of FIG. 2. The panel 12D may represent the operational status of the panel 120A during the first period F1, the panel 12E may represent the operational status of the panel 120A during the second period F2, and the panel 12F may represent the operational status of the panel 120A during the third period F3. However, the present disclosure is not limited thereto.

In some embodiments, as shown at the top of FIG. 7, during the first period F1, a blue pixel P13, a blue pixel P23, and a blue pixel P33 of the panel 12D output the blue signal SB. A green pixel P42, a green pixel P52, and a green pixel P62 of the panel 12D output the green signal SG. A red pixel P71, a red pixel P81, and a red pixel P91 of the panel 12D output the red signal SR.

In some embodiments, during the second period F2, a red pixel P11, a red pixel P21, and a red pixel P31 of the panel 12E output the red signal SR. A blue pixel P43, a blue pixel P53, and a blue pixel P63 of the panel 12E output the blue signal SB. A green pixel P72, a green pixel P82, and a green pixel P92 of the panel 12E output the green signal SG.

In some embodiments, during the third period F3, a green pixel P12, a green pixel P22, and a green pixel P32 of the panel 12F output the green signal SG. A red pixel P41, a red pixel P51, and a red pixel P61 of the panel 12F output the red signal SR. A blue pixel P73, a blue pixel P83, and a blue pixel P93 of the panel 12F output the blue signal SB.

Please refer to FIGS. 1, 2, 4, and 7. In one embodiment, during the first period F1, the first region 121, the second region 122, and the third region 123 output the blue signal SB according to the third data signal SD3. The fourth region 124, the fifth region 125, and the sixth region 126 output the green signal SG according to the second data signal SD2. The seventh region 127, the eighth region 128, and the ninth region 129 output the red signal SR according to the first data signal SD1. The red signal SR, green signal SG, and blue signal SB are different from each other.

For example, as shown at the top of FIGS. 2 and 7, during the first period F1, a blue pixel P13 of the first region 121, a blue pixel P23 of the second region 122, and a blue pixel P33 of the third region 123 each receive the third data signal SD3, the third emission signal EM3[1], and the reference signal SN[1] to output the blue signal SB. A green pixel P42 of the fourth region 124, a green pixel P52 of the fifth region 125, and a green pixel P62 of the sixth region 126 each receive the second data signal SD2, the second emission signal EM2[2], and the reference signal SN[2] to output the green signal SG. A red pixel P71 of the seventh region 127, a red pixel P81 of the eighth region 128, and a red pixel P91 of the ninth region 129 each receive the first data signal SD1, the first emission signal EM1[3], and the reference signal SN[3] to output the red signal SR. However, the present disclosure is not limited thereto.

In one embodiment, the signal supplier 110A outputs the first data signal SD1, the second data signal SD2, and the third data signal SD3 according to the first switching signal SWA, the second switching signal SWB, and the third switching signal SWC.

In this embodiment, during the first period F1, the signal supplier 110A sequentially receives the third switching signal SWC, the second switching signal SWB, and the first switching signal SWA and outputs the third data signal SD3, the second data signal SD2, and the first data signal SD1 according to the third switching signal SWC, the second switching signal SWB, and the first switching signal SWA, respectively.

For example, during the first period F1, the first switch A1, the sixth switch A6, and the ninth switch A9 of the signal supplier 110A receive the third switching signal SWC to turn on and output the third data signal SD3. Then, the second switch A2, the fifth switch A5, and the eighth switch A8 of the signal supplier 110A receive the second switching signal SWB to turn on and output the second data signal SD2. Next, the third switch A3, the sixth switch A6, and the ninth switch A9 of the signal supplier 110A receive the first switching signal SWA to turn on and output the first data signal SD1. However, the present disclosure is not limited thereto.

In one embodiment, during a second period F2, a signal supplier 110A sequentially receives a first switching signal SWA, a third switching signal SWC, and a second switching signal SWB and outputs a first data signal SD1, a third data signal SD3, and a second data signal SD2 according to the first switching signal SWA, the third switching signal SWC, and the second switching signal SWB, respectively.

For example, during the second period F2, a first switch A1, a sixth switch A6, and a ninth switch A9 of the signal supplier 110A receive the first switching signal SWA to turn on and output the first data signal SD1. Then, a second switch A2, a fifth switch A5, and an eighth switch A8 of the signal supplier 110A receive the third switching signal SWC to turn on and output the third data signal SD3. Next, a third switch A3, a sixth switch A6, and a ninth switch A9 of the signal supplier 110A receive the second switching signal SWB to turn on and output the second data signal SD2. However, the present disclosure is not limited thereto.

In one embodiment, during the second period F2, a first region 121, a second region 122, and a third region 123 output a red signal SR according to the first data signal SD1. A fourth region 124, a fifth region 125, and a sixth region 126 output a blue signal SB according to the third data signal SD3. A seventh region 127, an eighth region 128, and a ninth region 129 output the green signal SR according to the second data signal SD2. The second period F2 follows the first period F1.

For example, as shown at the top of FIGS. 2 and 7, during the second period F2, a red pixel P11 of the first region 121, a red pixel P21 of the second region 122, and a red pixel P31 of the third region 123 each receive the first data signal SD1, a first emission signal EM1[1], and a reference signal SN[1] to output the red signal SB. A blue pixel P43 of the fourth region 124, a blue pixel P53 of the fifth region 125, and a blue pixel P63 of the sixth region 126 each receive the second data signal SD2, a second emission signal EM2[2], and a reference signal SN[2] to output the blue signal SB. A green pixel P72 of the seventh region 127, a green pixel P82 of the eighth region 128, and a green pixel P92 of the ninth region 129 each receive the second data signal SD2, a second emission signal EM2[3], and a reference signal SN[3] to output the red signal SR. However, the present disclosure is not limited thereto.

In one embodiment, during a third period F3, the signal supplier 110A sequentially receives the second switching signal SWB, the first switching signal SWA, and the third switching signal SWC and outputs the second data signal SD2, the first data signal SD1, and the third data signal SD3 according to the second switching signal SWB, the first switching signal SWA, and the third switching signal SWC, respectively.

For example, during the second period F2, the first switch A1, the sixth switch A6, and the ninth switch A9 of the signal supplier 110A receive the second switching signal SWB to turn on and output the second data signal SD2. Then, the second switch A2, the fifth switch A5, and the eighth switch A8 of the signal supplier 110A receive the first switching signal SWA to turn on and output the first data signal SD1. Next, the third switch A3, the sixth switch A6, and the ninth switch A9 of the signal supplier 110A receive the third switching signal SWC to turn on and output the third data signal SD3. However, the present disclosure is not limited thereto.

In one embodiment, during the third period F3, the first region 121, the second region 122, and the third region 123 output a green signal SG according to the second data signal SD2. The fourth region 124, the fifth region 125, and the sixth region 126 output the red signal SR according to the first data signal SD1. The seventh region 127, the eighth region 128, and the ninth region 129 output the blue signal SB according to the third data signal SD3. The third period F3 follows the second period F2.

For example, as shown at the top of FIGS. 2 and 7, during the third period F3, a green pixel P12 of the first region 121, a green pixel P22 of the second region 122, and a green pixel P32 of the third region 123 each receive the second data signal SD2, the second emission signal EM2[1], and the reference signal SN[1] to output the green signal SG. A red pixel P41 of the fourth region 124, a red pixel P51 of the fifth region 125, and a red pixel P61 of the sixth region 126 each receive the first data signal SD1, the first emission signal EM1[2], and the reference signal SN[2] to output the red signal SR. A blue pixel P73 of the seventh region 127, a blue pixel P83 of the eighth region 128, and a blue pixel P93 of the ninth region 129 each receive the third data signal SD3, the third emission signal EM3[3], and the reference signal SN[3] to output the blue signal SB. However, the present disclosure is not limited thereto.

In some embodiments, the display driving device 100A of FIG. 2, the first switching signal SWA, the second switching signal SWB, and the third switching signal SWC of FIG. 7 can be operated in conjunction with a timing diagram 500 and a timing diagram 500A.

It is noted that a plurality of first emission signals EM1[1] to EM1[3], a plurality of second emission signals EM2[1] to EM2[3], a plurality of third emission signals EM3[1] to EM3[3], and a plurality of reference signals SN[1] to SN[3] can be adjusted according to the panels 12D, 12E, and 12F of FIG. 7. However, the present disclosure is not limited thereto.

In some embodiments, during the first period F1, the first emission signal EM1[3] has a pulse signal, the second emission signal EM2[2] has a pulse signal, and the third emission signal EM3[1] has a pulse signal. However, the present disclosure is not limited thereto.

In this embodiment, then, during the second period F2, the first emission signal EM1[1] has a pulse signal, the second emission signal EM2[3] has a pulse signal, and the third emission signal EM3[2] has a pulse signal. However, the present disclosure is not limited thereto.

In this embodiment, next, during the third period F3, the first emission signal EM1[2] has a pulse signal, the second emission signal EM2[1] has a pulse signal, and the third emission signal EM3[3] has a pulse signal. However, the present disclosure is not limited thereto.

Figure 8:
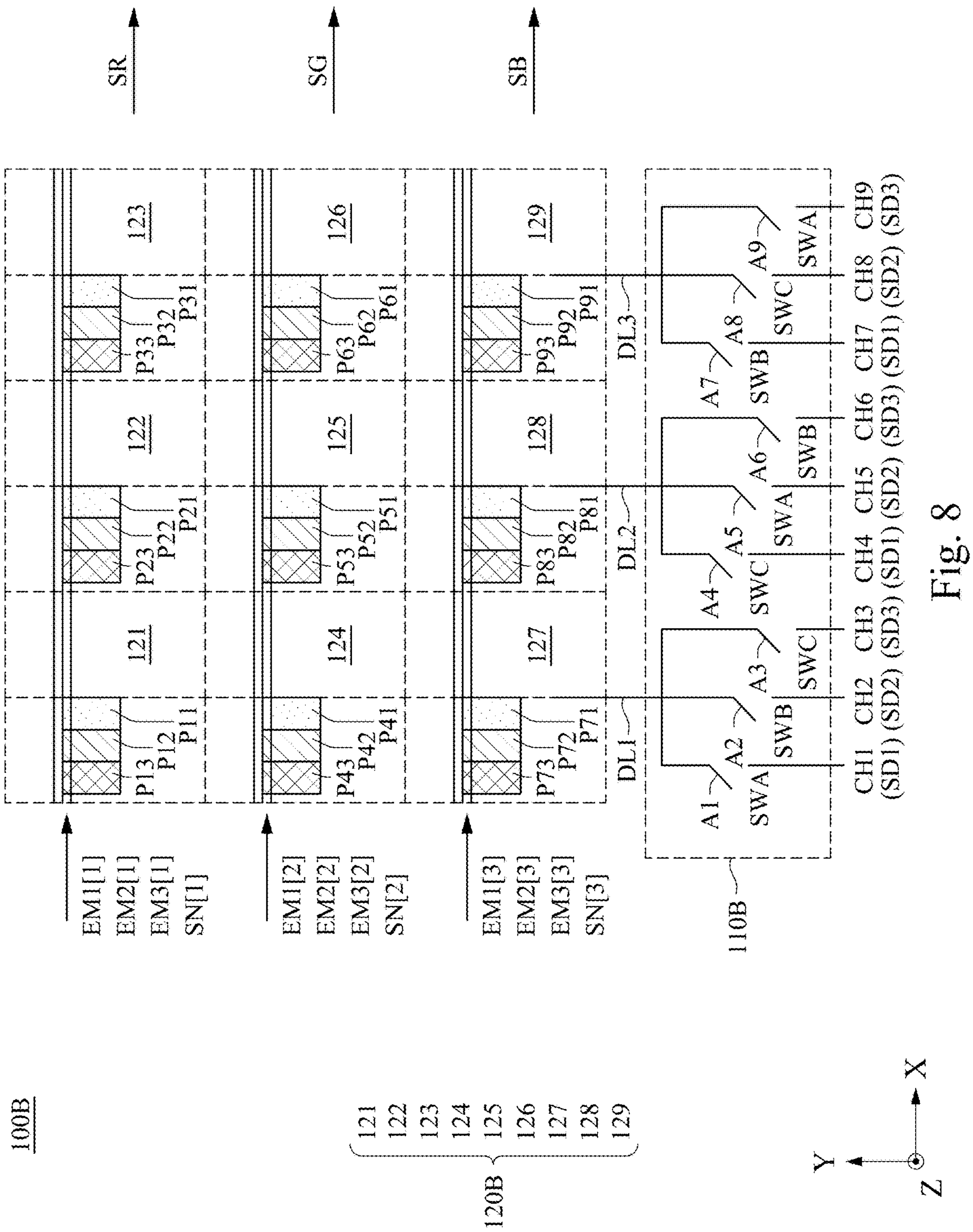
FIG. 8 is a circuit schematic diagram illustrating a display driving device according to an embodiment of the present disclosure.

FIG. 8 illustrates a circuit schematic diagram of a display driving device according to an embodiment of the present disclosure.

As shown in FIG. 8, in some embodiments, a display driving device 100B includes a signal supplier 110B and a panel 120B. Regarding the coupling relationship, the panel 120B is coupled to the signal supplier 110B.

For example, the display driving device 100B, the signal supplier 110B, and the panel 120B of FIG. 8 may each correspond to the display driving device 100, the signal supplier 110, and the panel 120 of FIG. 1. However, the present disclosure is not limited thereto.

Additionally, the hardware structure and operation of the display driving device 100B, the signal supplier 110B, and the panel 120B of FIG. 8 are similar to the hardware structure and operation of the display driving device 100A, the signal supplier 110A, and the panel 120A of FIG. 2.

It is noted that, compared to the signal supplier 110A of FIG. 2, the signal supplier 110B of FIG. 8 has the fourth switch A4 receiving the third switching signal SWC, the fifth switch A5 receiving the first switching signal SWA, the sixth switch A6 receiving the second switching signal SWB, the seventh switch A7 receiving the second switching signal SWB, the eighth switch A8 receiving the third switching signal SWC, and the ninth switch A9 receiving the first switching signal SWA. However, the present disclosure is not limited thereto.

Figure 9:
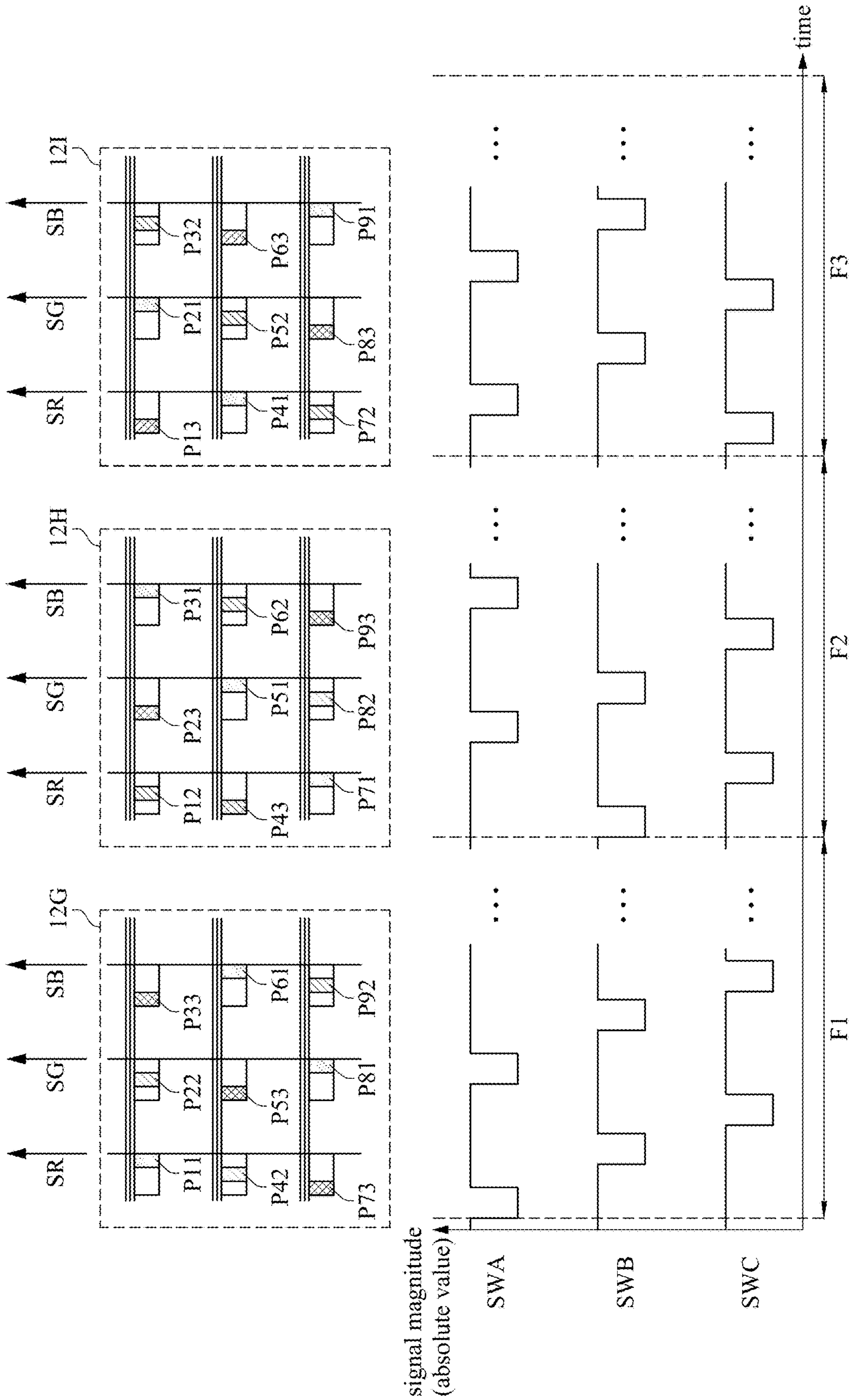
FIG. 9 is an operation scenario diagram illustrating a display driving device according to an embodiment of the present disclosure.

FIG. 9 illustrates an operation scenario of a display driving device according to an embodiment of the present disclosure. As shown in FIG. 9, in some embodiments, FIG. 9 depicts the operational status of a panel 12G, a panel 12H, and a panel 12I at different times and the timing variations of the corresponding first switching signal SWA, second switching signal SWB, and third switching signal SWC.

For example, the panel 12G, the panel 12H, and the panel 12I of FIG. 9 may each correspond to the panel 120B of FIG. 8. The panel 12G may represent the operational state of the panel 120B during the first period F1, the panel 12H may represent the operational state of the panel 120B during the second period F2, and the panel 12I may represent the operational state of the panel 120B during the third period F3. However, the present disclosure is not limited thereto.

In some embodiments, as shown at the top of FIG. 9, during the first period F1, a red pixel P11, a red pixel P61, and a red pixel P81 of the panel 12G output the red signal SR. A green pixel P22, a green pixel P42, and a green pixel P92 of the panel 12G output the green signal SG. A blue pixel P33, a blue pixel P53, and a blue pixel P73 of the panel 12G output the blue signal SB.

In some embodiments, during the second period F2, a green pixel P12, a green pixel P62, and a green pixel P82 of the panel 12H output the green signal SG. A blue pixel P23, a blue pixel P43, and a blue pixel P93 of the panel 12E output the blue signal SB. A red pixel P31, a red pixel P51, and a red pixel P71 of the panel 12E output the red signal SR.

In some embodiments, during the third period F3, a blue pixel P13, a blue pixel P63, and a blue pixel P83 of the panel 12I output the blue signal SB. A red pixel P21, a red pixel P51, and a red pixel P61 of the panel 12I output the red signal SR. A green pixel P32, a green pixel P52, and a green pixel P72 of the panel 12I output the green signal SG.

Figure 10:
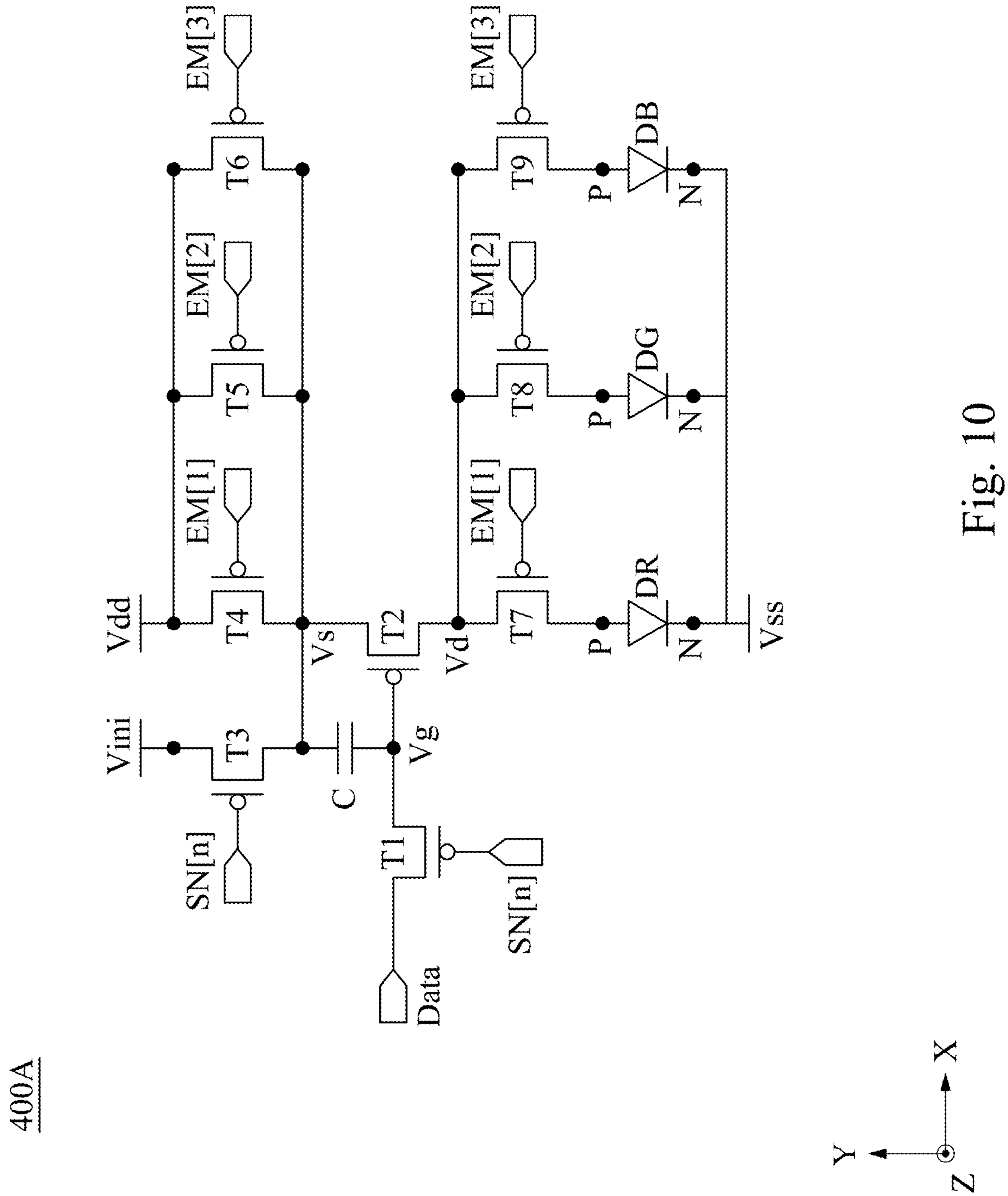
FIG. 10 is a detailed circuit diagram of a pixel circuit of a display driving device according to an embodiment of the present disclosure.

FIG. 10 illustrates a detailed circuit diagram of a pixel circuit of a display driving device according to an embodiment of the present disclosure. As shown in FIG. 10, in some embodiments, the pixel circuit 400A includes a plurality of transistors T1 to T9, a capacitor C, and light emitters DR, DG, and DB.

For example, the hardware structure and operation of the pixel circuit 400A in FIG. 10 can be similar to the pixel circuit 400 in FIG. 4. To keep the description concise, further details are omitted here.

In some embodiments, it is noted that in the pixel circuit 400A of FIG. 10, the control terminal of the transistor T4 and the control terminal of the transistor T7 can each receive a main light-emitting signal EM[1], the control terminal of the transistor T5 and the control terminal of the transistor T8 can each receive a main light-emitting signal EM[2], and the control terminal of the transistor T6 and the control terminal of the transistor T9 can each receive a main light-emitting signal EM[3].

For example, the main light-emitting signal EM[1] can be a first light-emitting signal EM1[1], a second light-emitting signal EM2[1], or a third light-emitting signal EM3[1]. The main light-emitting signal EM[2] can be a first light-emitting signal EM1[2], a second light-emitting signal EM2[2], or a third light-emitting signal EM3[2]. The main light-emitting signal EM[3] can be a first light-emitting signal EM1[3], a second light-emitting signal EM2[3], or a third light-emitting signal EM3[3], but the present disclosure is not limited thereto.

Figure 11:
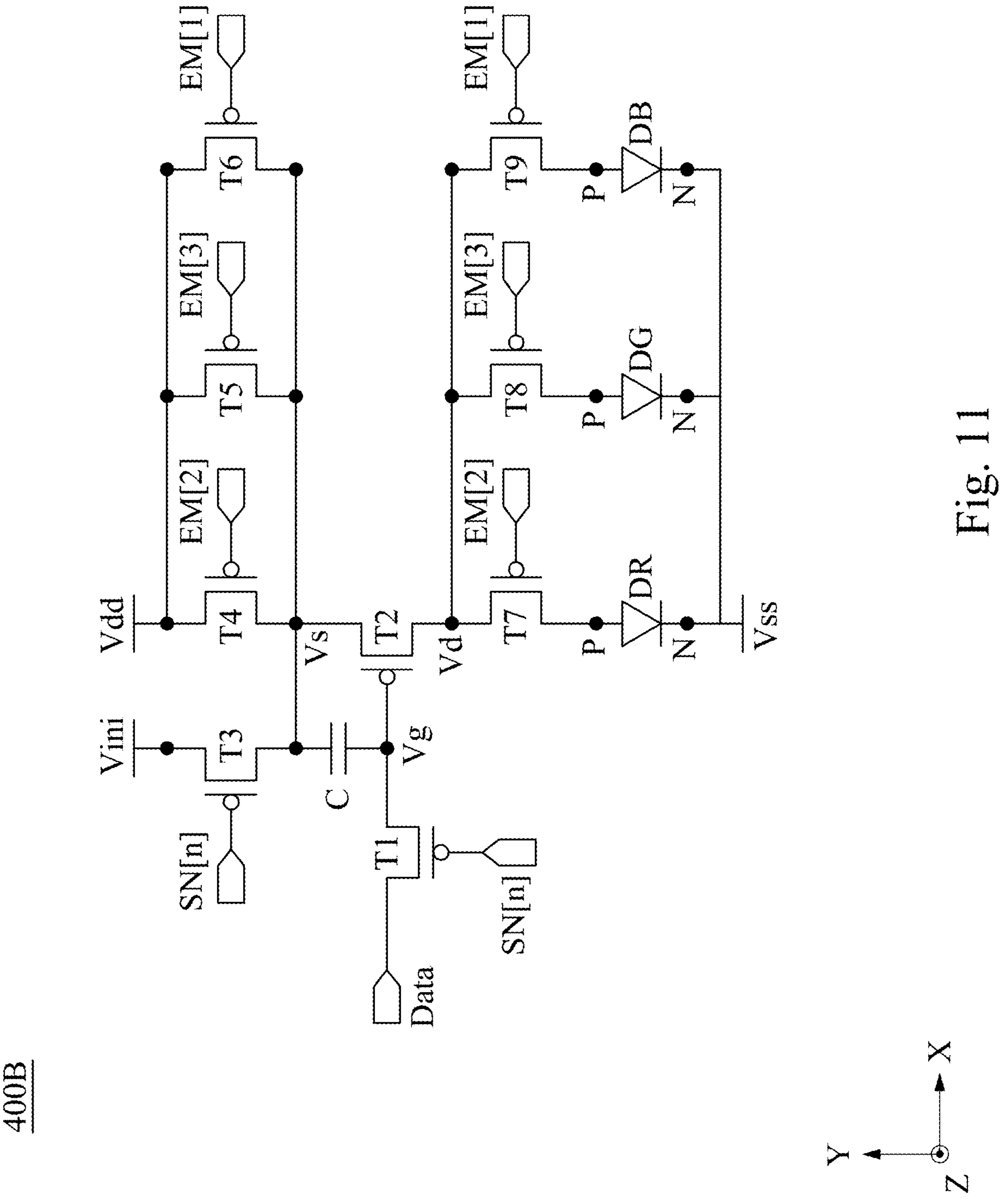
FIG. 11 is a detailed circuit diagram of a pixel circuit of a display driving device according to an embodiment of the present disclosure.

FIG. 11 illustrates a detailed circuit diagram of a pixel circuit of a display driving device according to an embodiment of the present disclosure. As shown in FIG. 11, in some embodiments, the pixel circuit 400B includes a plurality of transistors T1 to T9, a capacitor C, and light emitters DR, DG, and DB.

For example, the hardware structure and operation of the pixel circuit 400B in FIG. 11 can be similar to the pixel circuit 400 in FIG. 4. To keep the description concise, further details are omitted here.

In some embodiments, it is noted that in the pixel circuit 400B of FIG. 11, the control terminal of the transistor T4 and the control terminal of the transistor T7 can each receive a main light-emitting signal EM[2], the control terminal of the transistor T5 and the control terminal of the transistor T8 can each receive a main light-emitting signal EM[3], and the control terminal of the transistor T6 and the control terminal of the transistor T9 can each receive a main light-emitting signal EM[1].

For example, the main light-emitting signal EM[1] can be a first light-emitting signal EM1[1], a second light-emitting signal EM2[1], or a third light-emitting signal EM3[1]. The main light-emitting signal EM[2] can be a first light-emitting signal EM1[2], a second light-emitting signal EM2[2], or a third light-emitting signal EM3[2]. The main light-emitting signal EM[3] can be a first light-emitting signal EM1[3], a second light-emitting signal EM2[3], or a third light-emitting signal EM3[3], but the present disclosure is not limited thereto.

Figure 12:
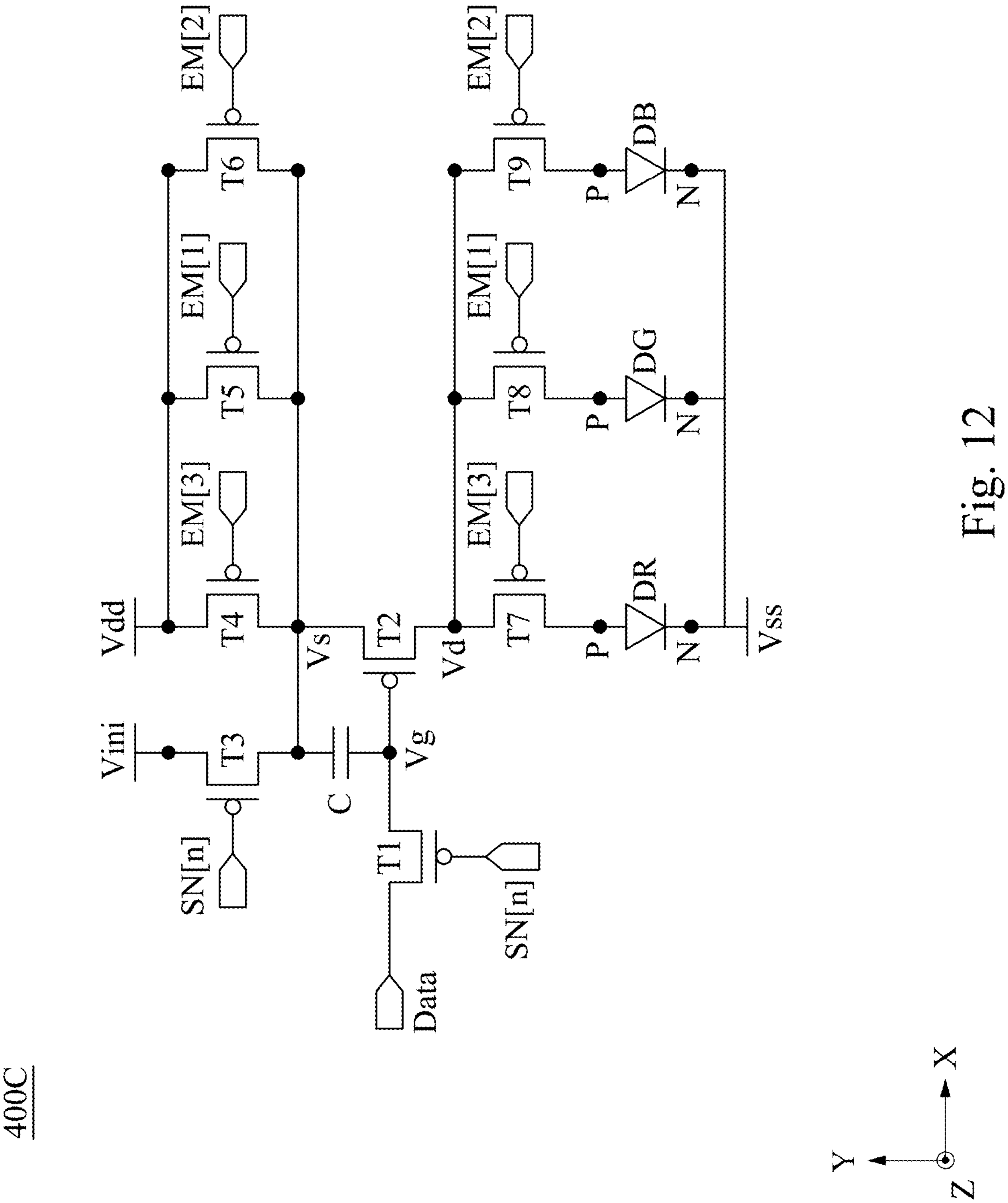
FIG. 12 is a detailed circuit diagram of a pixel circuit of a display driving device according to an embodiment of the present disclosure.

FIG. 12 illustrates a detailed circuit diagram of a pixel circuit of a display driving device according to an embodiment of the present disclosure. As shown in FIG. 12, in some embodiments, the pixel circuit 400C includes a plurality of transistors T1 to T9, a capacitor C, and light emitters DR, DG, and DB.

For example, the hardware structure and operation of the pixel circuit 400C in FIG. 12 can be similar to the pixel circuit 400 in FIG. 4. To keep the description concise, further details are omitted here.

In some embodiments, it is noted that in the pixel circuit 400C of FIG. 12, the control terminal of the transistor T4 and the control terminal of the transistor T7 can each receive a main light-emitting signal EM[3], the control terminal of the transistor T5 and the control terminal of the transistor T8 can each receive a main light-emitting signal EM[1], and the control terminal of the transistor T6 and the control terminal of the transistor T9 can each receive a main light-emitting signal EM[2].

For example, the main light-emitting signal EM[1] can be a first light-emitting signal EM1[1], a second light-emitting signal EM2[1], or a third light-emitting signal EM3[1]. The main light-emitting signal EM[2] can be a first light-emitting signal EM1[2], a second light-emitting signal EM2[2], or a third light-emitting signal EM3[2]. The main light-emitting signal EM[3] can be a first light-emitting signal EM1[3], a second light-emitting signal EM2[3], or a third light-emitting signal EM3[3], but the present disclosure is not limited thereto.

Please refer to FIG. 8 to FIG. 12 together. In some embodiments, the first region 121, the fourth region 124, and the seventh region 127 of FIG. 8 can each have the pixel circuit 400A of FIG. 10. The second region 122, the fifth region 125, and the eighth region 128 of FIG. 8 can each have the pixel circuit 400B of FIG. 11. The third region 123, the sixth region 126, and the ninth region 129 of FIG. 8 can each have the pixel circuit 400C of FIG. 12, but the present disclosure is not limited thereto.

It is noted that the pixel circuit 400A of the first region 121, the pixel circuit 400B of the second region 122, and the pixel circuit 400C of the third region 123 can each receive the first light-emitting signal EM1[1], the second light-emitting signal EM2[1], the third light-emitting signal EM3[1], and the reference signal SN[1]. The pixel circuit 400A of the fourth region 124, the pixel circuit 400B of the fifth region 125, and the pixel circuit 400C of the sixth region 126 can each receive the first light-emitting signal EM1[2], the second light-emitting signal EM2[2], the third light-emitting signal EM3[2], and the reference signal SN[2]. The pixel circuit 400A of the seventh region 127, the pixel circuit 400B of the eighth region 128, and the pixel circuit 400C of the ninth region 129 can each receive the first light-emitting signal EM1[3], the second light-emitting signal EM2[3], the third light-emitting signal EM3[3], and the reference signal SN[3].

In some embodiments, the first region 121, the sixth region 126, and the eighth region 128 of FIG. 8 can each have the pixel circuit 400A of FIG. 10. The second region 122, the fourth region 124, and the ninth region 129 of FIG. 8 can each have the pixel circuit 400B of FIG. 11. The third region 123, the fifth region 125, and the seventh region 127 can each have the pixel circuit 400C of FIG. 12, but the present disclosure is not limited thereto.

It is noted that the pixel circuit 400A of the first region 121, the pixel circuit 400B of the second region 122, and the pixel circuit 400C of the third region 123 can each receive the first light-emitting signal EM1[1], the second light-emitting signal EM2[1], the third light-emitting signal EM3[1], and the reference signal SN[1]. The pixel circuit 400B of the fourth region 124, the pixel circuit 400C of the fifth region 125, and the pixel circuit 400A of the sixth region 126 can each receive the first light-emitting signal EM1[2], the second light-emitting signal EM2[2], the third light-emitting signal EM3[2], and the reference signal SN[2]. The pixel circuit 400C of the seventh region 127, the pixel circuit 400A of the eighth region 128, and the pixel circuit 400B of the ninth region 129 can each receive the first light-emitting signal EM1[3], the second light-emitting signal EM2[3], the third light-emitting signal EM3[3], and the reference signal SN[3].

Figure 13:
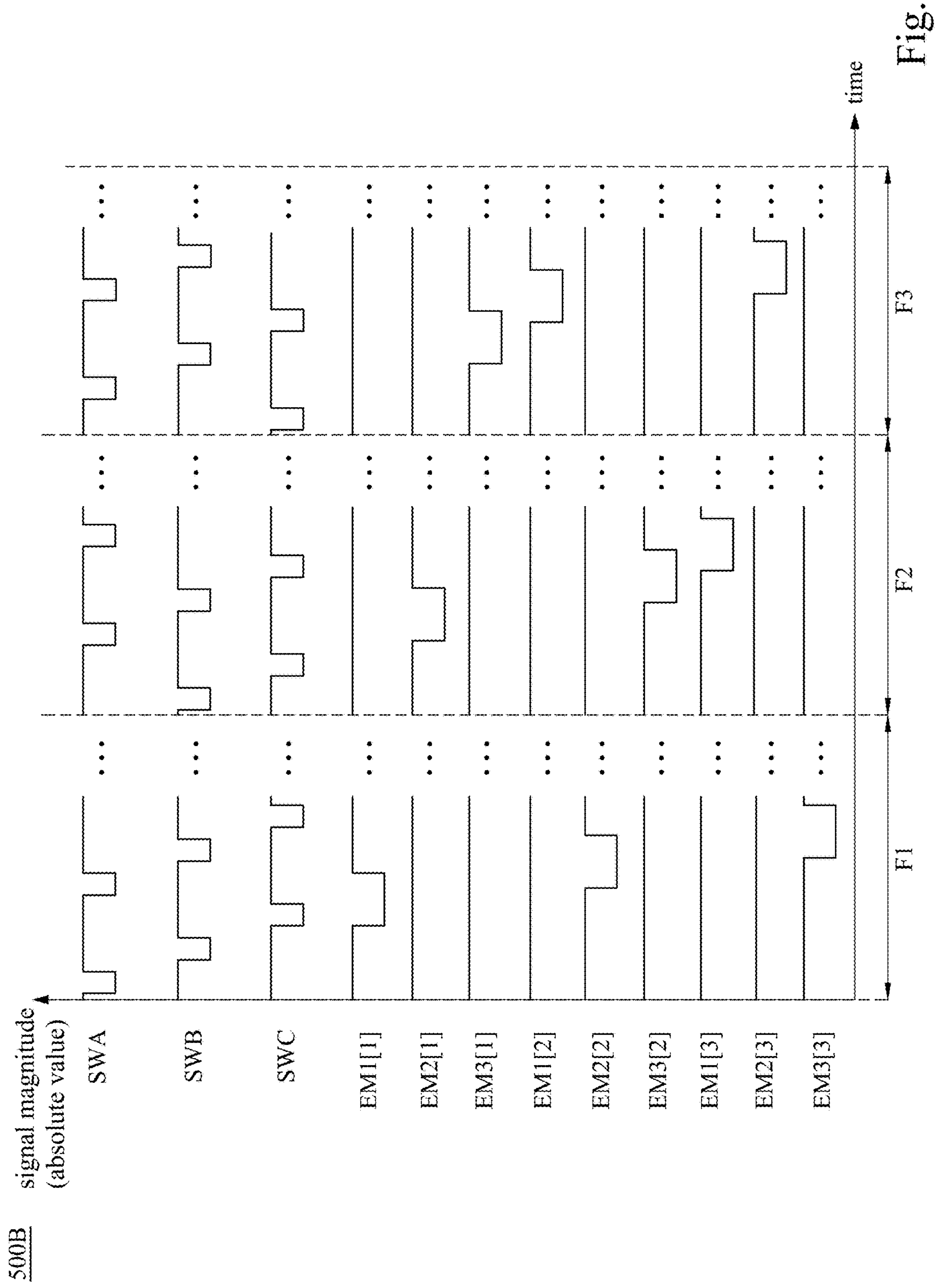
FIG. 13 is a timing diagram of a plurality of signals of a display driving device according to an embodiment of the present disclosure.

FIG. 13 illustrates a timing diagram of a plurality of signals of a display driving device according to an embodiment of the present disclosure. As shown in FIG. 13, in some embodiments, the plurality of signals and their corresponding timing relationships in FIG. 13 are similar to the plurality of signals and their corresponding timing relationships in FIG. 5. To keep the description concise, further details are omitted here.

Figure 14:
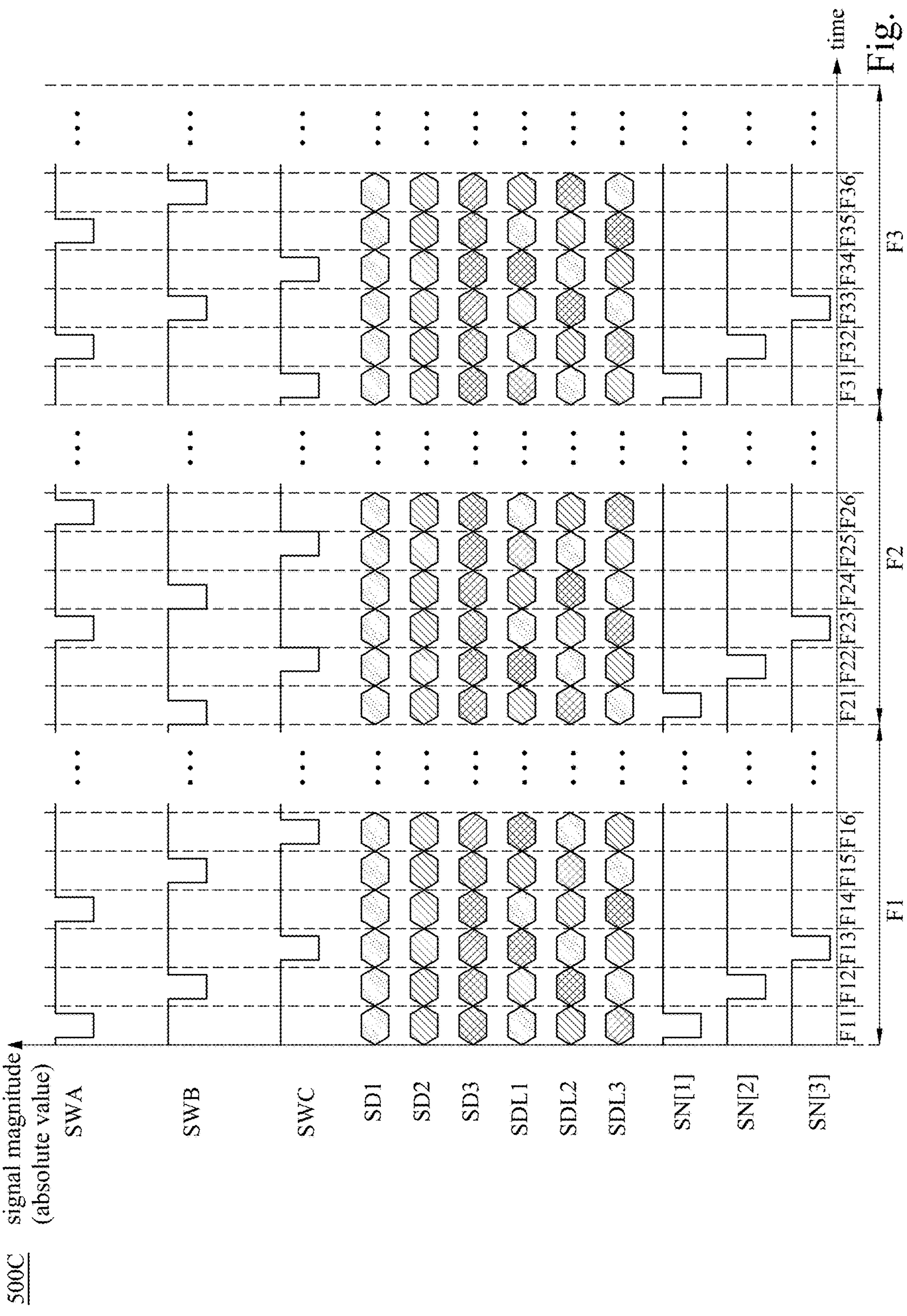
FIG. 14 is a timing diagram of a plurality of signals of a display driving device according to an embodiment of the present disclosure.

FIG. 14 illustrates a timing diagram of a plurality of signals of a display driving device according to an embodiment of the present disclosure. As shown in FIG. 14, in some embodiments, the plurality of signals and their corresponding timing relationships in FIG. 14 are similar to the plurality of signals and their corresponding timing relationships in FIG. 6. To keep the description concise, further details are omitted here.

It is noted that the signal SDL1 can be the result of the data line DL1 in FIG. 8 receiving the first data signal SD1, the second data signal SD2, and the third data signal SD3. The signal SDL2 can be the result of the data line DL2 in FIG. 8 receiving the first data signal SD1, the second data signal SD2, and the third data signal SD3. The signal SDL3 can be the result of the data line DL3 in FIG. 8 receiving the first data signal SD1, the second data signal SD2, and the third data signal SD3, but the present disclosure is not limited thereto.

Please refer to FIG. 13 and FIG. 14 together. In some embodiments, a set of timing diagrams includes the timing diagram 500B of FIG. 13 and the timing diagram 500C of FIG. 14.

For example, the timing diagram 500B and the timing diagram 500C can constitute a set of timing diagrams, but the present disclosure is not limited thereto.

Please refer to FIG. 1 and FIG. 8 to FIG. 14 together. In one embodiment, during a first period F1, the first region 121, the sixth region 126, and the eighth region 128 output a red signal SR based on a first data signal SD1. The second region 122, the fourth region 124, and the ninth region 129 output a green signal SG based on a second data signal SD2, and the third region 123, the fifth region 125, and the seventh region 127 output a blue signal SB based on a third data signal SD3. The red signal SR, green signal SG, and blue signal SB are different from each other.

For example, as shown above FIG. 2 and FIG. 9, during the first period F1, the red pixel P11 of the first region 121, the red pixel P61 of the sixth region 126, and the red pixel P81 of the eighth region 128 can each output the red signal SR based on the first data signal SD1. The green pixel P22 of the second region 122, the green pixel P42 of the fourth region 124, and the green pixel P92 of the ninth region 129 can each output the green signal SG based on the second data signal SD2, and the blue pixel P33 of the third region 123, the blue pixel P53 of the fifth region 125, and the blue pixel P73 of the seventh region 127 can each output the blue signal SB based on the third data signal SD3.

In one embodiment, during the first period F1, a signal supplier 110A sequentially receives a first switching signal SWA, a second switching signal SWB, and a third switching signal SWC and outputs the first data signal SD1, the second data signal SD2, and the third data signal SD3 based on the first switching signal SWA, the second switching signal SWB, and the third switching signal SWC, respectively.

For example, during the first period F1, the first switch A1, the fifth switch A5, and the ninth switch A9 of the signal supplier 110A receive the first switching signal SWA to turn on and output the first data signal SD1. Then, the second switch A2, the sixth switch A6, and the seventh switch A7 of the signal supplier 110A receive the second switching signal SWB to turn on and output the second data signal SD2. Next, the third switch A3, the fourth switch A4, and the eighth switch A8 of the signal supplier 110A receive the third switching signal SWC to turn on and output the third data signal SD3, but the present disclosure is not limited thereto.

In one embodiment, during a second period F2, the signal supplier 110A sequentially receives the second switching signal SWB, the third switching signal SWC, and the first switching signal SWA and outputs the second data signal SD2, the third data signal SD3, and the first data signal SD1 based on the second switching signal SWB, the third switching signal SWC, and the first switching signal SWA, respectively.

For example, during the second period F2, the second switch A2, the sixth switch A6, and the seventh switch A7 of the signal supplier 110A receive the second switching signal SWB to turn on and output the second data signal SD2. Then, the third switch A3, the fourth switch A4, and the eighth switch A8 of the signal supplier 110A receive the third switching signal SWC to turn on and output the third data signal SD3. Next, the first switch A1, the fifth switch A5, and the ninth switch A9 of the signal supplier 110A receive the first switching signal SWA to turn on and output the first data signal SD1, but the present disclosure is not limited thereto.

In one embodiment, during the second period F2, the first region 121, the sixth region 126, and the eighth region 128 output the green signal SG based on the second data signal SD2. The second region 122, the fourth region 124, and the ninth region 129 output the blue signal SB based on the third data signal SD3, and the third region 123, the fifth region 125, and the seventh region 127 output the red signal SR based on the first data signal SD1. The second period F2 follows the first period F1.

For example, as shown above FIG. 2 and FIG. 9, during the second period F2, the green pixel P12 of the first region 121, the green pixel P62 of the sixth region 126, and the green pixel P82 of the eighth region 128 can each output the green signal SG based on the second data signal SD2. The blue pixel P23 of the second region 122, the blue pixel P43 of the fourth region 124, and the blue pixel P93 of the ninth region 129 can each output the blue signal SB based on the third data signal SD3, and the red pixel P31 of the third region 123, the red pixel P51 of the fifth region 125, and the red pixel P71 of the seventh region 127 can each output the red signal SR based on the first data signal SD1.

In one embodiment, during a third period F3, the signal supplier 110A sequentially receives the third switching signal SWC, the first switching signal SWA, and the second switching signal SWB and outputs the third data signal SD3, the first data signal SD1, and the second data signal SD2 based on the third switching signal SWC, the first switching signal SWA, and the second switching signal SWB, respectively.

For example, during the third period F3, the third switch A3, the fourth switch A4, and the eighth switch A8 of the signal supplier 110A receive the third switching signal SWC to turn on and output the third data signal SD3. Then, the first switch A1, the fifth switch A5, and the ninth switch A9 of the signal supplier 110A receive the first switching signal SWA to turn on and output the first data signal SD1. Next, the second switch A2, the sixth switch A6, and the seventh switch A7 of the signal supplier 110A receive the second switching signal SWB to turn on and output the second data signal SD2, but the present disclosure is not limited thereto.

In one embodiment, during the third period F3, the first region 121, the sixth region 126, and the eighth region 128 output the blue signal SB based on the third data signal SD3. The second region 121, the fourth region 124, and the ninth region 129 output the red signal SR based on the first data signal SD1, and the third region 123, the fifth region 125, and the seventh region 127 output the green signal SG based on the second data signal SD2. The third period F3 follows the second period F2.

For example, as shown above FIG. 2 and FIG. 9, during the third period F3, the blue pixel P13 of the first region 121, the blue pixel P63 of the sixth region 126, and the blue pixel P83 of the eighth region 128 can each output the blue signal SB based on the third data signal SD3. The red pixel P21 of the second region 122, the red pixel P41 of the fourth region 124, and the red pixel P91 of the ninth region 129 can each output the red signal SR based on the first data signal SD1, and the green pixel P32 of the third region 123, the green pixel P52 of the fifth region 125, and the green pixel P72 of the seventh region 127 can each output the green signal SG based on the second data signal SD2.

In one embodiment, the first region 121, the fourth region 124, and the seventh region 127 of the panel 120B each have the first pixel circuit 400A. The second region 122, the fifth region 125, and the eighth region 128 of the panel 120B each have the second pixel circuit 400B. The third region 123, the sixth region 126, and the ninth region 129 of the panel 120B each have the third pixel circuit 400C.

For example, the first pixel circuit 400A, the second pixel circuit 400B, and the third pixel circuit 400C may be hardware-connected or designed similarly to each other, but the signals received by some components of the first pixel circuit 400A, the second pixel circuit 400B, and the third pixel circuit 400C differ. The present disclosure is not limited thereto.

In this embodiment, the first pixel circuit 400A outputs the red signal SR based on the first main light-emitting signal EM[1], outputs the green signal SG based on the second main light-emitting signal EM[2], and outputs the blue signal SB based on the third main light-emitting signal EM[3].

For example, the first main light-emitting signal EM[1] can be the first light-emitting signal EM1[1], the second light-emitting signal EM2[1], or the third light-emitting signal EM3[1]. The second main light-emitting signal EM[2] can be the first light-emitting signal EM1[2], the second light-emitting signal EM2[2], or the third light-emitting signal EM3[2]. The third main light-emitting signal EM[3] can be the first light-emitting signal EM1[3], the second light-emitting signal EM2[3], or the third light-emitting signal EM3[3], but the present disclosure is not limited thereto.

Additionally, the first pixel circuit 400A can output the red signal SR based on the first main light-emitting signal EM[1] and the first data signal SD1, output the green signal SG based on the second main light-emitting signal EM[2] and the second data signal SD2, and output the blue signal SB based on the third main light-emitting signal EM[3] and the third data signal SD3.

In this embodiment, the second pixel circuit 400B outputs the red signal SR based on the second main light-emitting signal EM[2], outputs the green signal SG based on the third main light-emitting signal EM[3], and outputs the blue signal SB based on the first main light-emitting signal EM[1].

For example, the second pixel circuit 400B can output the red signal SR based on the second main light-emitting signal EM[2] and the first data signal SD1, output the green signal SG based on the third main light-emitting signal EM[3] and the second data signal SD2, and output the blue signal SB based on the first main light-emitting signal EM[1] and the third data signal SD3, but the present disclosure is not limited thereto.

In this embodiment, the third pixel circuit 400C outputs the red signal SR based on the third main light-emitting signal EM[3], outputs the green signal SG based on the first main light-emitting signal EM[1], and outputs the blue signal SB based on the second main light-emitting signal EM[2].

For example, the third pixel circuit 400C can output the red signal SR based on the third main light-emitting signal EM[3] and the first data signal SD1, output the green signal SG based on the first main light-emitting signal EM[1] and the second data signal SD2, and output the blue signal SB based on the second main light-emitting signal EM[2] and the third data signal SD3, but the present disclosure is not limited thereto.

Figure 15:
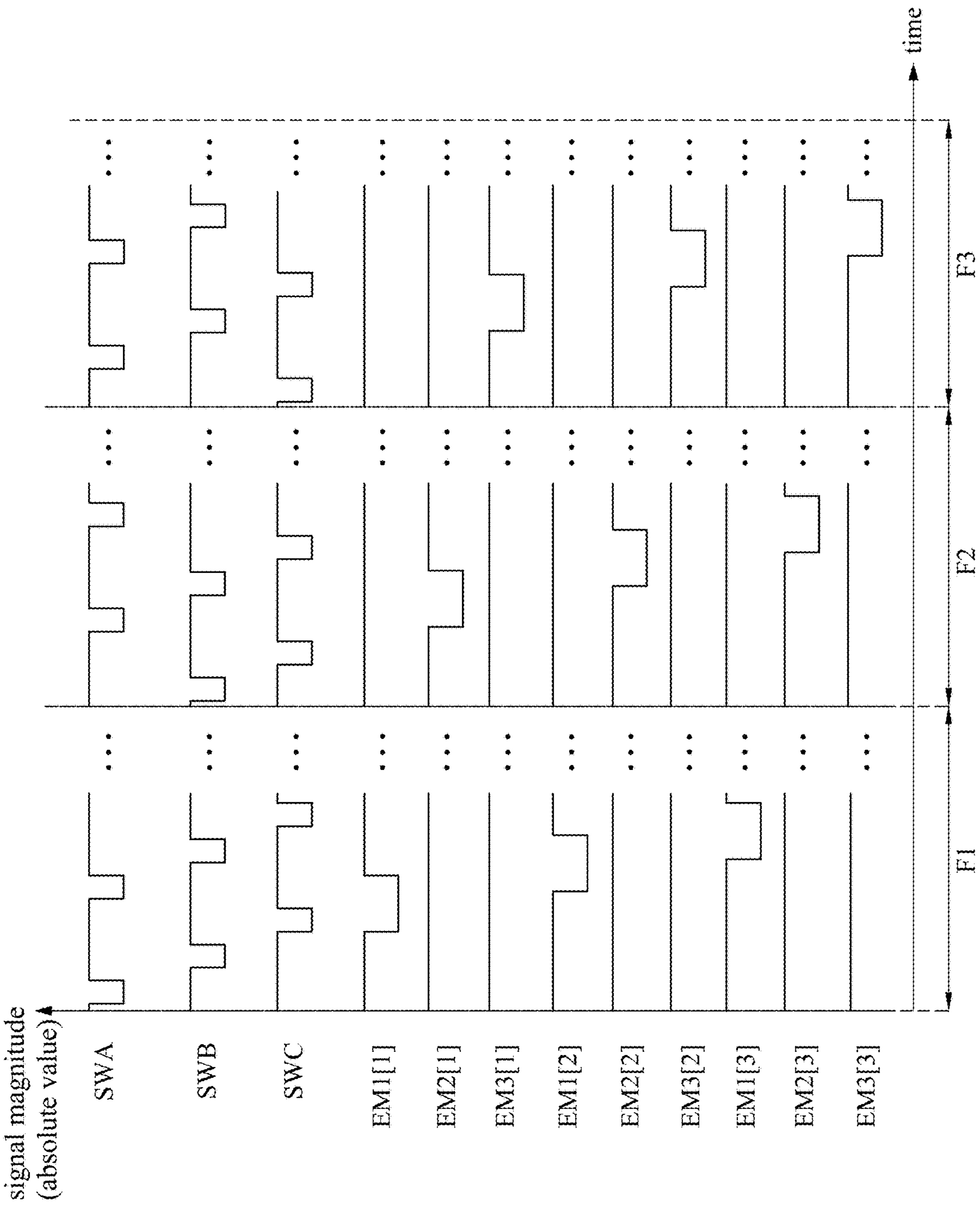
FIG. 15 is a timing diagram of a plurality of signals of a display driving device according to an embodiment of the present disclosure.

FIG. 15 illustrates a timing diagram of a plurality of signals of a display driving device according to an embodiment of the present disclosure. As shown in FIG. 15, in some embodiments, the plurality of signals and their corresponding timing relationships in FIG. 15 are similar to the plurality of signals and their corresponding timing relationships in FIG. 13. To keep the description concise, further details are omitted here.

It is noted that the plurality of first light-emitting signals EM1[1] to EM1[3], the plurality of second light-emitting signals EM2[1] to EM2[3], and the plurality of third light-emitting signals EM3[1] to EM3[3] in FIG. 15 have pulse signals and/or steady-level signals with timing differences compared to those in FIG. 13, but the present disclosure is not limited thereto.

Figure 16:
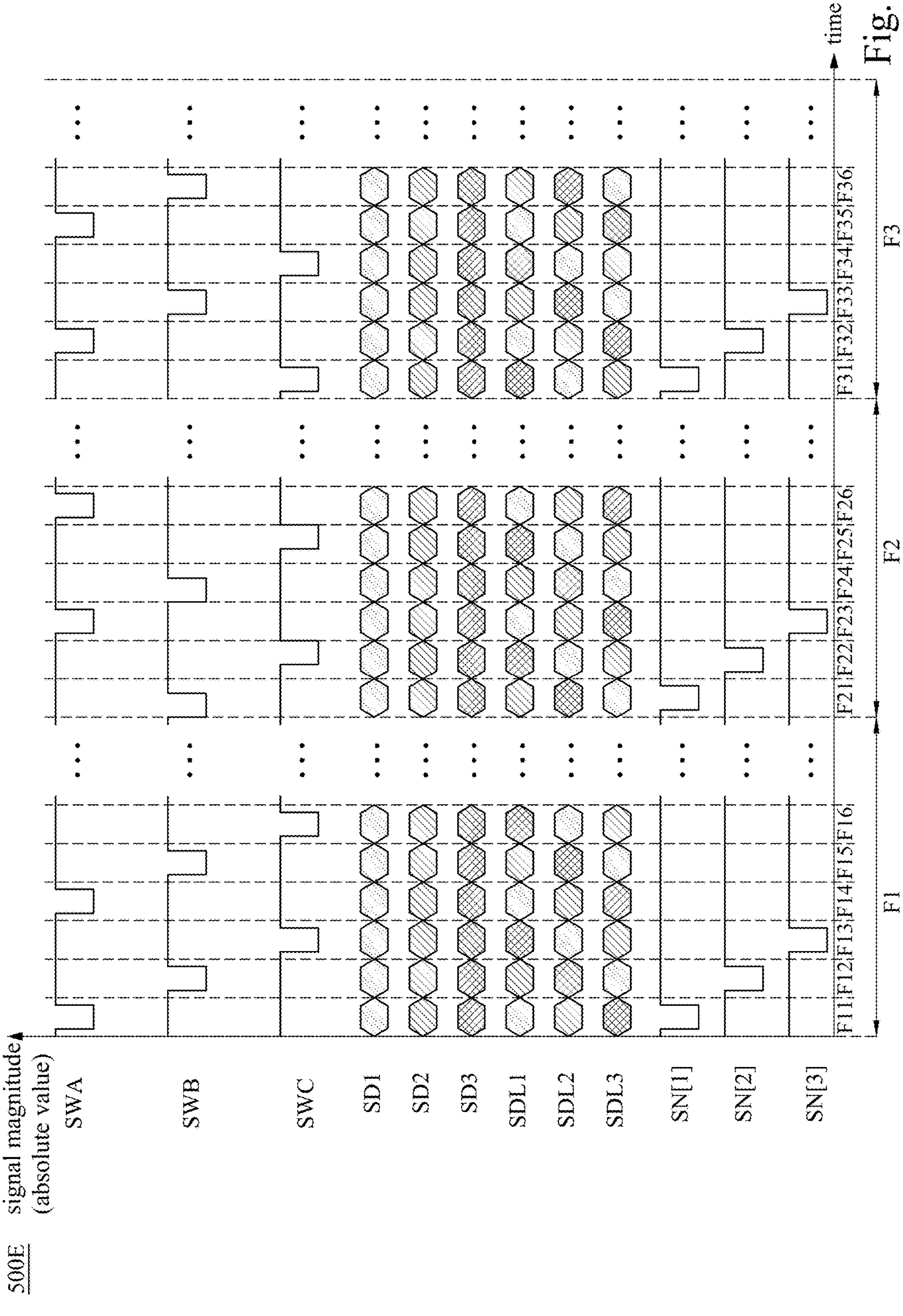
FIG. 16 is a timing diagram of a plurality of signals of a display driving device according to an embodiment of the present disclosure.

FIG. 16 illustrates a timing diagram of a plurality of signals of a display driving device according to an embodiment of the present disclosure. As shown in FIG. 16, in some embodiments, the plurality of signals and their corresponding timing relationships in FIG. 16 are similar to the plurality of signals and their corresponding timing relationships in FIG. 14. To keep the description concise, further details are omitted here.

Please refer to FIG. 15 and FIG. 16 together. In some embodiments, a set of timing diagrams includes the timing diagram 500D of FIG. 15 and the timing diagram 500E of FIG. 16.

For example, the timing diagram 500D and the timing diagram 500E can constitute a set of timing diagrams, but the present disclosure is not limited thereto.

Please refer to FIG. 1, FIG. 8 to FIG. 12, FIG. 15, and FIG. 16 together. In one embodiment, the first region 121, the sixth region 126, and the eighth region 128 of the panel 120B each have the first pixel circuit 400A. The second region 122, the fourth region 124, and the ninth region 129 each have the second pixel circuit 400B. The third region 123, the fifth region 125, and the seventh region 127 each have the third pixel circuit 400C.

For example, the first pixel circuit 400A, the second pixel circuit 400B, and the third pixel circuit 400C may be hardware-connected or designed similarly to each other, but the signals received by some components of the first pixel circuit 400A, the second pixel circuit 400B, and the third pixel circuit 400C differ. The present disclosure is not limited thereto.

In this embodiment, the first pixel circuit 400A outputs the red signal SR based on the first main light-emitting signal EM[1], outputs the green signal SG based on the second main light-emitting signal EM[2], and outputs the blue signal SB based on the third main light-emitting signal EM[3].

For example, the first main light-emitting signal EM[1] can be the first light-emitting signal EM1[1], the second light-emitting signal EM2[1], or the third light-emitting signal EM3[1]. The second main light-emitting signal EM[2] can be the first light-emitting signal EM1[2], the second light-emitting signal EM2[2], or the third light-emitting signal EM3[2]. The third main light-emitting signal EM[3] can be the first light-emitting signal EM1[3], the second light-emitting signal EM2[3], or the third light-emitting signal EM3[3], but the present disclosure is not limited thereto.

Additionally, the first pixel circuit 400A can output the red signal SR based on the first main light-emitting signal EM[1] and the first data signal SD1, output the green signal SG based on the second main light-emitting signal EM[2] and the second data signal SD2, and output the blue signal SB based on the third main light-emitting signal EM[3] and the third data signal SD3.

In this embodiment, the second pixel circuit 400B outputs the red signal SR based on the second main light-emitting signal EM[2], outputs the green signal SG based on the third main light-emitting signal EM[3], and outputs the blue signal SB based on the first main light-emitting signal EM[1].

For example, the second pixel circuit 400B can output the red signal SR based on the second main light-emitting signal EM[2] and the first data signal SD1, output the green signal SG based on the third main light-emitting signal EM[3] and the second data signal SD2, and output the blue signal SB based on the first main light-emitting signal EM[1] and the third data signal SD3, but the present disclosure is not limited thereto.

In this embodiment, the third pixel circuit 400C outputs the red signal SR based on the third main light-emitting signal EM[3], outputs the green signal SG based on the first main light-emitting signal EM[1], and outputs the blue signal SB based on the second main light-emitting signal EM[2].

For example, the third pixel circuit 400C can output the red signal SR based on the third main light-emitting signal EM[3] and the first data signal SD1, output the green signal SG based on the first main light-emitting signal EM[1] and the second data signal SD2, and output the blue signal SB based on the second main light-emitting signal EM[2] and the third data signal SD3, but the present disclosure is not limited thereto.

In some embodiments, in general technology, a display may have field sequential color (FSC) control technology, allowing the display to sequentially show red, green, and blue screens.

However, when the display rapidly shows (e.g., with a refresh rate greater than 180 Hz) red, green, and blue screens in sequence, users might see a normal image, but the display can easily cause flickering due to rapid switching of brightness and darkness, leading to dizziness when viewing the display.

In some embodiments, compared to general technology, the display driving devices 100, 100A, 100B of the present disclosure can provide a comfortable viewing experience by displaying red, green, and blue signals in sections on the panel. For example, the panel can refresh the screen from top to bottom with red, green, and blue vertical stripes, or display the red, green, and blue signals in a checkerboard pattern.

From the above embodiments of the present disclosure, it can be seen that the display driving device shown in the embodiments can achieve a comfortable viewing experience for users by interleaving the display of images through a plurality of display regions (or main pixels).

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A display driving device, comprising:
- a signal supplier, configured to output a first data signal, a second data signal, and a third data signal; and
- a panel coupled to the signal supplier, comprising:
  - a first region;
  - a second region located on one side of the first region;
  - a third region located on one side of the second region;
  - a fourth region located on other side of the first region;
  - a fifth region located on one side of the fourth region;
  - a sixth region, located on one side of the fifth region;
  - a seventh region located on other side of the fourth region;
  - an eighth region located on one side of the seventh region; and
  - a ninth region located on one side of the eighth region;
- wherein during a first period, the first region, the second region, and the third region output a red signal based on the first data signal, the fourth region, the fifth region, and the sixth region output a green signal based on the second data signal, and the seventh region, the eighth region and the ninth region output a blue signal based on the third data signal;
- wherein the red signal, the green signal, and the blue signal are different from each other.

2. The display driving device of claim 1, wherein during the first period, the signal supplier sequentially receives a first switching signal, a second switching signal and a third switching signal, and sequentially outputs the first data signal, the second data signal and the third data signal based on the first switching signal, the second switching signal, and the third switching signal.

3. The display driving device of claim 2, wherein during a second period, the signal supplier sequentially receives the second switching signal, the third switching signal and the first switching signal, and sequentially outputs the second data signal, the third data signal and the first data signal based on the second switching signal, the third switching signal, and the first switching signal.

4. The display driving device of claim 3, wherein during the second period, the first region, the second region, and the third region output the green signal based on the second data signal, the fourth region, the fifth region, and the sixth region output the blue signal based on the third data signal, and the seventh region, the eighth region and the ninth region output the red signal based on the first data signal;
- wherein the second period is after the first period.

5. The display driving device of claim 4, wherein during a third period, the signal supplier sequentially receives the third switching signal, the first switching signal and the second switching signal, and sequentially outputs the third data signal, the first data signal and the second data signal based on the third switching signal, the first switching signal, and the second switching signal.

6. The display driving device of claim 5, wherein during the third period, the first region, the second region, and the third region output the blue signal based on the third data signal, the fourth region, the fifth region, and the sixth region output the red signal based on the first data signal, and the seventh region, the eighth region and the ninth region output the green signal based on the second data signal;

wherein the third period is after the second period.

7. A display driving device, comprising:

a signal supplier, configured to output a first data signal, a second data signal, and a third data signal; and a panel coupled to the signal supplier, comprising:

a first region;

a second region located on one side of the first region;

a third region located on one side of the second region;

a fourth region located on other side of the first region;

a fifth region located on one side of the fourth region;

a sixth region located on one side of the fifth region;

a seventh region located on other side of the fourth region;

an eighth region located on one side of the seventh region; and a ninth region located on one side of the eighth region;

wherein during a first period, the first region, the second region, and the third region output a blue signal based on the third data signal, the fourth region, the fifth region, and the sixth region output a green signal based on the second data signal, and the seventh region, the eighth region and the ninth region output a red signal based on the first data signal;

wherein the red signal, the green signal, and the blue signal are different from each other.

8. The display driving device of claim 7, wherein the signal supplier outputs a first data signal, a second data signal, and a third data signal based on a first switching signal, a second switching signal, and a third switching signal;

wherein during the first period, the signal supplier sequentially receives the third switching signal, the second switching signal and the first switching signal, and sequentially outputs the third data signal, the second data signal and the first data signal based on the third switching signal, the second switching signal, and the first switching signal.

9. The display driving device of claim 8, wherein during a second period, the signal supplier sequentially receives the first switching signal, the third switching signal and the second switching signal, and sequentially outputs the first data signal, the third data signal and the second data signal based on the first switching signal, the third switching signal, and the second switching signal.

10. The display driving device of claim 9, wherein during the second period, the first region, the second region, and the third region output the red signal based on the first data signal, the fourth region, the fifth region, and the sixth region output the blue signal based on the third data signal, and the seventh region, the eighth region and the ninth region output the green signal based on the second data signal;

wherein the second period is after the first period.

11. The display driving device of claim 10, wherein during a third period, the signal supplier sequentially receives the second switching signal, the first switching signal and the third switching signal, and sequentially outputs the second data signal, the first data signal and the third data signal based on the second switching signal, the first switching signal, and the third switching signal.

12. The display driving device of claim 11, wherein during the third period, the first region, the second region, and the third region output the green signal based on the second data signal, the fourth region, the fifth region, and the sixth region output the red signal based on the first data signal, and the seventh region, the eighth region and the ninth region output the blue signal based on the third data signal;

wherein the third period is after the second period.

13. A display driving device, comprising:

a signal supplier, configured to output a first data signal, a second data signal, and a third data signal; and a panel coupled to the signal supplier, comprising:

a first region;

a second region located on one side of the first region;

a third region located on one side of the second region;

a fourth region located on other side of the first region;

a fifth region located on one side of the fourth region;

a sixth region located on one side of the fifth region;

a seventh region located on other side of the fourth region;

an eighth region located on one side of the seventh region; and a ninth region located on one side of the eighth region;

wherein during a first period, the first region, the sixth region, and the eighth region output a red signal based on the first data signal, the second region, the fourth region, and the ninth region output a green signal based on the second data signal, and the third region, the fifth region and the seventh region output a blue signal based on the third data signal;

wherein the red signal, the green signal, and the blue signal are different from each other.

14. The display driving device of claim 13, wherein during the first period, the signal supplier sequentially receives a first switching signal, a second switching signal and a third switching signal, and sequentially outputs the first data signal, the second data signal and the third data signal based on the first switching signal, the second switching signal, and the third switching signal.

15. The display driving device of claim 14, wherein during a second period, the signal supplier sequentially receives the second switching signal, the third switching signal and the first switching signal, and sequentially outputs the second data signal, the third data signal and the first data signal based on the second switching signal, the third switching signal, and the first switching signal.

16. The display driving device of claim 15, wherein during the second period, the first region, the sixth region, and the eighth region output the green signal based on the second data signal, the second region, the fourth region, and the ninth region output the blue signal based on the third data signal, and the third region, the fifth region and the seventh region output the red signal based on the first data signal;

wherein the second period is after the first period.

17. The display driving device of claim 16, wherein during a third period, the signal supplier sequentially receives the third switching signal, the first switching signal and the second switching signal, and sequentially outputs the third data signal, the first data signal and the second data signal based on the third switching signal, the first switching signal, and the second switching signal.

18. The display driving device of claim 17, wherein during the third period, the first region, the sixth region, and the eighth region output the blue signal based on the third data signal, the second region, the fourth region, and the ninth region output the red signal based on the first data signal, and the third region, the fifth region and the seventh region output the green signal based on the second data signal;

wherein the third period is after the second period.

19. The display driving device of claim 18, wherein the first region, the fourth region, and the seventh region of the panel each have a first pixel circuit;

wherein the second region, the fifth region, and the eighth region of the panel each have a second pixel circuit;

wherein the third region, the sixth region, and the ninth region of the panel each have a third pixel circuit;

wherein the first pixel circuit outputs the red signal based on a first main light-emitting signal, the first pixel circuit outputs the green signal based on a second main light-emitting signal, and the first pixel circuit outputs the blue signal based on a third main light-emitting signal;

wherein the second pixel circuit outputs the red signal based on the second main light-emitting signal, the second pixel circuit outputs the green signal based on the third main light-emitting signal, and the first pixel circuit outputs the blue signal based on the first main light-emitting signal;

wherein the third pixel circuit outputs the red signal based on the third main light-emitting signal, the third pixel circuit outputs the green signal based on the first main light-emitting signal, and the third pixel circuit outputs the blue signal based on the second main light-emitting signal.

20. The display driving device of claim 18, wherein the first region, the sixth region, and the eighth region of the panel each have a first pixel circuit;

wherein the second region, the fourth region, and the ninth region of the panel each have a second pixel circuit;

wherein the third region, the fifth region, and the seventh region of the panel each have a third pixel circuit;

wherein the first pixel circuit outputs the red signal based on a first main light-emitting signal, the first pixel circuit outputs the green signal based on a second main light-emitting signal, and the first pixel circuit outputs the blue signal based on a third main light-emitting signal;

wherein the second pixel circuit outputs the red signal based on the second main light-emitting signal, the second pixel circuit outputs the green signal based on the third main light-emitting signal, and the first pixel circuit outputs the blue signal based on the third main light-emitting signal;

wherein the third pixel circuit outputs the red signal based on the third main light-emitting signal, the third pixel circuit outputs the green signal based on the first main light-emitting signal, and the third pixel circuit outputs the blue signal based on the second main light-emitting signal.

* * * * *